US012635680B2

(12) United States Patent
Kwak et al.

(10) Patent No.: US 12,635,680 B2
(45) Date of Patent: May 26, 2026

(54) AGRICULTURAL PRODUCT APPLICATION FIELD MAP VISUALIZATION AND CONTROL

(71) Applicant: Deere & Company, Moline, IL (US)

(72) Inventors: Michelle Kwak, Ankeny, IA (US); Andrew M. Colosky, Urbandale, IA (US)

(73) Assignee: Deere & Company, Moline, IL (US)

( * ) Notice: Subject to any disclaimer, the term of this patent is extended or adjusted under 35 U.S.C. 154(b) by 137 days.

(21) Appl. No.: 18/663,758

(22) Filed: May 14, 2024

(65) Prior Publication Data

US 2024/0292826 A1 Sep. 5, 2024

Related U.S. Application Data

(63) Continuation of application No. 17/188,210, filed on Mar. 1, 2021, now Pat. No. 12,010,986.

(Continued)

(51) Int. Cl.
| | |
|---|---|
| *A01M 7/00* | (2006.01) |
| *A01C 21/00* | (2006.01) |
| *A01C 23/04* | (2006.01) |

(52) U.S. Cl.
CPC ......... *A01M 7/0089* (2013.01); *A01C 21/005* (2013.01); *A01C 23/047* (2013.01); *A01M 7/0042* (2013.01)

(58) Field of Classification Search
CPC .............. A01M 7/0089; A01M 7/0042; A01M 7/0007; A01C 21/005; A01C 23/047;

(Continued)

(56) References Cited

U.S. PATENT DOCUMENTS

| | | | |
|---|---|---|---|
| 8,186,288 B2 * | 5/2012 | Chinkiwsky | ......... A01B 79/005 |
| | | | 111/900 |
| 8,488,874 B2 | 7/2013 | Zaman et al. | |

(Continued)

FOREIGN PATENT DOCUMENTS

| | | | |
|---|---|---|---|
| CN | 120612632 A * | 9/2025 | |
| EP | 1000540 A1 * | 5/2000 | .......... A01M 7/0089 |

(Continued)

OTHER PUBLICATIONS

Prosecution History for U.S. Appl. No. 17/188,320 including: Restriction Requirement dated Jul. 6, 2023 and Non Final Office Action dated Aug. 31, 2023, 23 pages.

(Continued)

*Primary Examiner* — Mary Cheung

(74) *Attorney, Agent, or Firm* — Christopher J. Volkmann; KELLY, HOLT & CHRISTENSON PLLC

(57) ABSTRACT

A method includes obtaining image data indicative of plant matter on a field and identifying, based on the image data, one or more areas on the field in a path of an agricultural machine to apply an agricultural product. The agricultural machine includes a product application system having a plurality of actuatable applicator mechanisms, and the one or more areas includes some, but not all, of the field in the path of an agricultural machine. The method includes operating the product application system to apply the agricultural product to the one or more areas, and generating a user interface display that displays a field representation that visually distinguishes the one or more areas, identified based on the image data, from other areas on the field.

20 Claims, 27 Drawing Sheets

Related U.S. Application Data

(60) Provisional application No. 63/107,672, filed on Oct. 30, 2020.

(58) Field of Classification Search
CPC ........ A01B 79/005; G06T 2207/10024; G06T 2207/30188; G06T 7/004; G06V 10/945; G06V 20/188; G06F 3/147; G09G 2340/12
See application file for complete search history.

(56) References Cited

U.S. PATENT DOCUMENTS

| | | | |
|---|---|---|---|
| 10,324,461 | B2 | 6/2019 | Ogura |
| 10,721,859 | B2 | 7/2020 | Wu et al. |
| 11,071,991 | B2 | 7/2021 | Serrat et al. |
| 11,197,409 | B2 | 12/2021 | Redden |
| 11,357,153 | B2 * | 6/2022 | Foster .................. G06T 7/0006 |
| 2014/0180549 | A1 | 6/2014 | Siemens et al. |
| 2016/0125331 | A1 | 5/2016 | Vollmar |
| 2019/0066234 | A1 * | 2/2019 | Bedoya ................ A01B 79/005 |
| 2019/0098825 | A1 * | 4/2019 | Neitemeier ............. B30B 9/305 |
| 2019/0107521 | A1 | 4/2019 | Riley |
| 2019/0220666 | A1 | 7/2019 | Kiepe et al. |
| 2019/0246617 | A1 | 8/2019 | Grimm et al. |
| 2019/0311209 | A1 | 10/2019 | Ducote et al. |
| 2020/0005474 | A1 * | 1/2020 | Ferrari .................. G06V 10/46 |
| 2020/0072809 | A1 | 3/2020 | Bhanu et al. |
| 2021/0127659 | A1 | 5/2021 | Loukili et al. |
| 2022/0132829 | A1 | 5/2022 | Kwak et al. |
| 2022/0138464 | A1 | 5/2022 | Kwak et al. |
| 2022/0142142 | A1 | 5/2022 | Van Alphen |
| 2023/0131770 | A1 | 4/2023 | Stoller et al. |

FOREIGN PATENT DOCUMENTS

| | | | | |
|---|---|---|---|---|
| WO | 2019148138 | A1 | 8/2019 | |
| WO | 2020169817 | A1 | 8/2020 | |
| WO | WO-2020178663 | A1 * | 9/2020 | ......... G02B 27/0006 |
| WO | WO-2022223282 | A1 * | 10/2022 | .......... A01M 7/0089 |

OTHER PUBLICATIONS

Prosecution History for U.S. Appl. No. 17/188,258 Including: Restriction Requirement dated Feb. 16. 2023, Non Compliant Responsive Amendment dated Jul. 24, 2023 and Non Final Office Action dated Oct. 3, 2023, 23 pages.

Application and Drawings for U.S. Appl. No. 17/188,258, filed Mar. 1, 2021, 68 pages.

Application and Drawings for U.S. Appl. No. 17/188,320, filed Mar. 1, 2021.

Extended European Search Report and Written Opinion Issued in European Patent Application No. 21201772.7, dated Apr. 4, 2022, 7 pages.

Extended European Search Report and Written Opinion Issued in European Patent Application No. 21201994.7, dated May 4, 2022, 7 pages.

Extended European Search Report and Written Opinion issued in European Patent Application No. 21201980.6, dated Apr. 4, 2022, 7 pages.

Notice of Allowance for U.S. Appl. No. 17/188,210, dated Feb. 28, 2024, 8 pages.

Non Final Office Action for U.S. Appl. No. 17/188,210, dated Nov. 3, 2023, 23 pages.

* cited by examiner

320

100

108

108

108

322

322

322

322

322

322

322

322

AGRICULTURAL PRODUCT APPLICATION FIELD MAP VISUALIZATION AND CONTROL

CROSS-REFERENCE TO RELATED APPLICATION

The present application is a continuation of and claims priority to U.S. patent application Ser. No. 17/188,210, filed on Mar. 1, 2021, which is based on and claims the benefit of U.S. provisional patent application Ser. No. 63/107,672, filed on Oct. 30, 2020; the contents of these applications are hereby incorporated by reference in their entirety.

FIELD OF THE DESCRIPTION

The present description generally relates to agricultural sprayers or other agricultural applicators that apply a substance to a field. More specifically, but not by limitation, the present description relates to visualization and control of an agricultural sprayer or other applicator machine.

BACKGROUND

There are many different types of agricultural machines. One such machine is an agricultural applicator machine configured to apply an agricultural substance (liquid or dry forms) to a field. One example agricultural applicator machine includes an agricultural spraying machine or sprayer. An agricultural sprayer, for example, often includes a tank or reservoir that holds a substance to be sprayed on an agricultural field. Such systems typically include a supply line or conduit mounted on a foldable, hinged, or retractable and extendible boom. The supply line is coupled to one or more spray nozzles mounted along the boom. Each spray nozzle is configured to receive the substance and direct the substance to a crop or field during application. As the sprayer travels through the field, the boom is moved to a deployed position and the substance is pumped from the tank or reservoir, through the nozzles, so that it is sprayed or applied to the field over which the sprayer is traveling.

The discussion above is merely provided for general background information and is not intended to be used as an aid in determining the scope of the claimed subject matter.

SUMMARY

An agricultural machine includes a product application system comprising a plurality of actuatable applicator mechanisms. Each actuatable applicator mechanism configured to apply a substance on a field. An imaging system is configured to obtain image data indicative of plant matter on the field. A control system is configured to control one or more of the actuatable applicator mechanisms to apply the substance to a dispersal area on the field based on the image data, and generate a user interface display that displays a field map including a display element that represents the dispersal area on the field.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3-1 illustrates an example broadcast spraying operation.

FIG. 3-2 illustrates an example image-based spraying operation.

FIGS. 5-1, 5-2, and 5-3 (collectively referred to as FIG. 5) provide a flow diagram illustrating an example operation of a visualization and control system for an agricultural spraying machine.

DETAILED DESCRIPTION

The present description generally relates to agricultural sprayer or applicator machines that apply a substance (liquid or dry forms) to a field. While aspects of the present disclosure will be described below in the context of an agricultural spraying machine configured to spray a liquid substance, the present features can also be utilized with applicator machines that apply dry substances.

Figure 1:
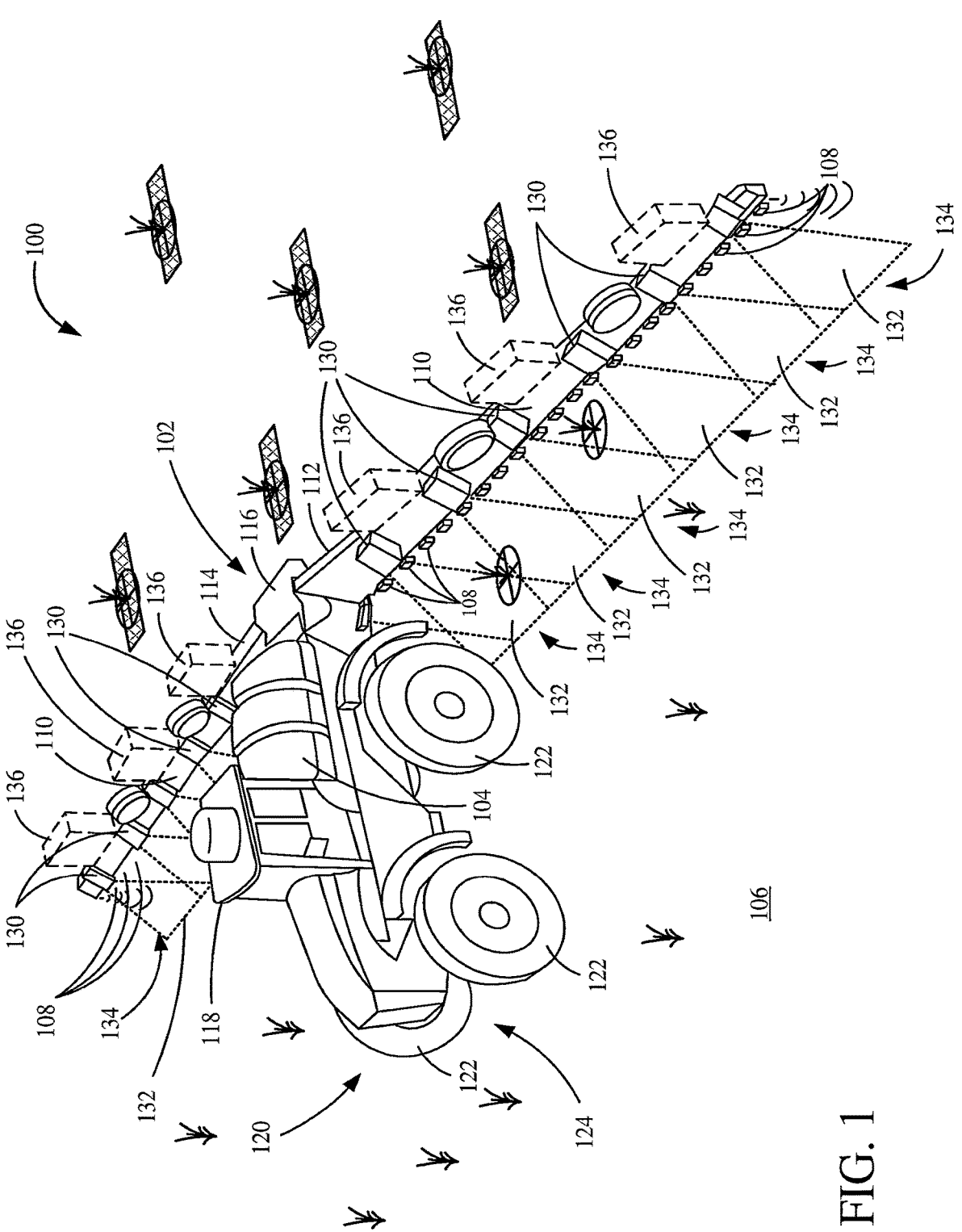
FIG. 1 illustrates an example agricultural spraying machine.

FIG. 1 illustrates one example of an agricultural spraying machine (or agricultural sprayer) 100. Machine 100 includes a spraying system 102 having at least one tank 104 containing a liquid that is to be applied to a field 106. Tank 104 are fluidically coupled to spray nozzles 108 by a delivery system comprising a set of conduits. A fluid pump is configured to pump the liquid from tank(s) 104 through the conduits through nozzles 108. Spray nozzles 108 are coupled to, and spaced apart along, boom 110. Boom 110 includes arms 112 and 114 which can articulate or pivot relative to a center frame 116. Thus, arms 112 and 114 are movable between a storage or transport position and an extended or deployed position (shown in FIG. 1). Machine 100 includes an operator compartment 118, a steering system 120 including a set of wheels 122, or other traction elements, and a propulsion system 124 (e.g., internal combustion engine).

Figure 2:
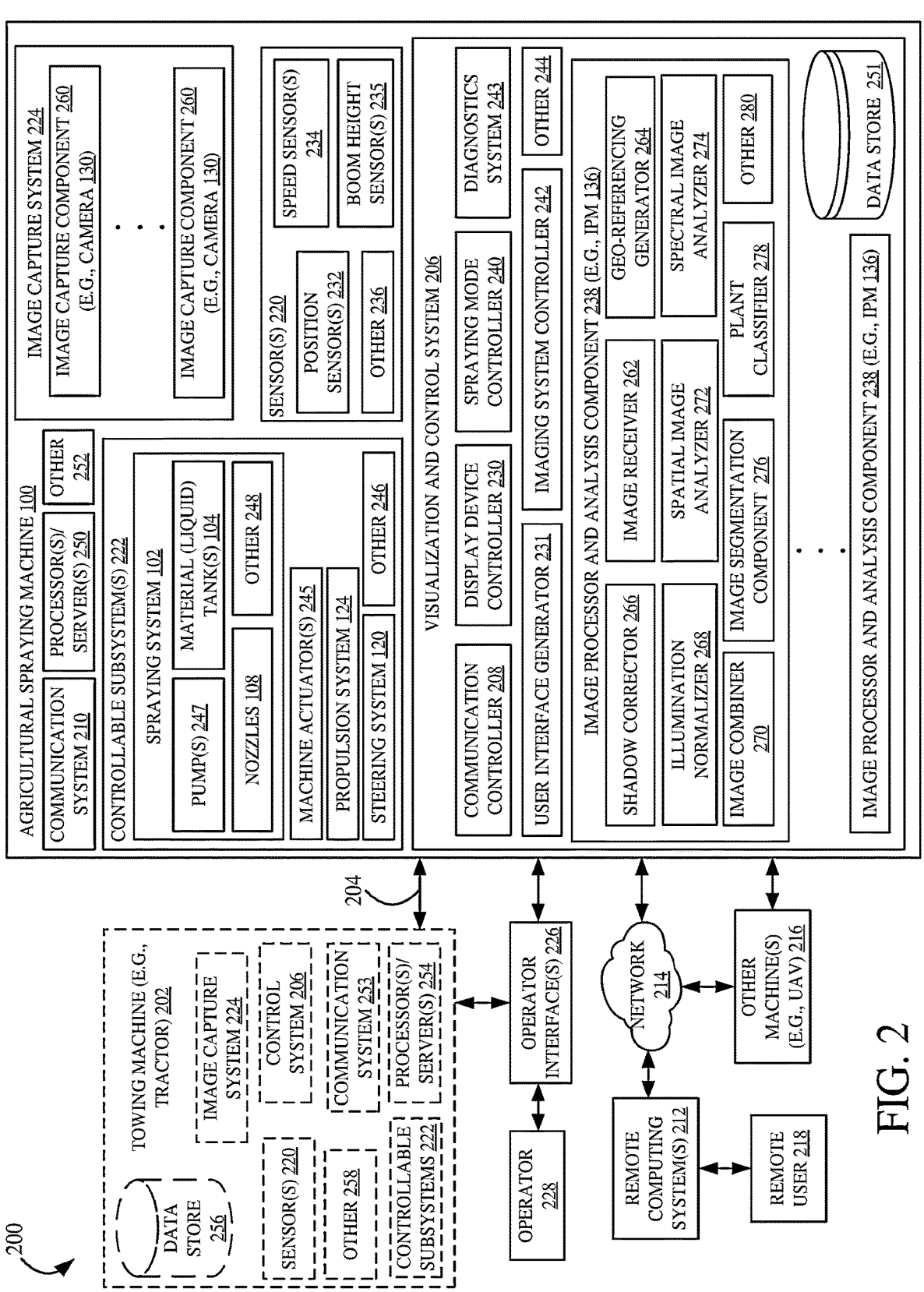
FIG. 2 is a block diagram of one example of an agricultural machine architecture.

FIG. 2 is a block diagram illustrates one example of an agricultural machine architecture 200 including agricultural spraying machine 100. It is noted that while agricultural spraying machine 100 is illustrated as a self-propelled machine in the present example, in other examples spraying machine 100 can include a towed implement coupled to a towing machine 202. An example of towing machine 202 includes a tractor that is coupled to machine 100 through one or more links 204 (electrical, mechanical, pneumatic, etc.).

Machine 100 includes a visualization and control system 206 (also referred to as control system 206) configured to control other components and systems of machine 100. For instance, control system 206 includes a communication controller 208 configured to control communication system 210 to communicate between components of machine 100 and/or with other machines or systems, such as remote computing system 212 and/or machine(s) 216, either directly or over a network 214. Network 214 can be any of a wide variety of different types of networks such as the Internet, a cellular network, a local area network, a near field communication network, or any of a wide variety of other networks or combinations of networks or communication systems.

A remote user 218 is illustrated interacting with remote computing system 212. Remote computing system 212 can be a wide variety of different types of computing systems. For example, remote computing system 212 can include remote server environment that is used by remote user 218. Further, it can include a mobile device, remote network, or a wide variety of other remote systems. Remote computing system 212 can include one or more processors or servers, a data store, and it can include other items as well.

Communication system 210 can include wired and/or wireless communication logic, which can be substantially any communication system that can be used by the systems and components of machine 100 to communicate information to other items, such as between control system 206, sensors 220, controllable subsystems 222, and an image capture system 224. In one example, communication system 210 communicates over a controller area network (CAN) bus (or another network, such as an Ethernet network, etc.) to communicate information between those items. The information can include the various sensor signals and output signals generated by the sensor variables and/or sensed variables.

Control system 206 is configured to control interfaces, such as operator interface(s) 226 that include input mechanisms configured to receive input from an operator 228 and output mechanisms that render outputs to operator 228. The input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc. Accordingly, control system 206 includes a display device controller 230 configured to control one or more display devices on, or associated with, machines 100 or 202 and a user interface generator 231 configured to generate user interface displays that are rendered on the display devices.

Sensor(s) 220 can include any of a wide variety of different types of sensors. In the illustrated example, sensors 220 include position sensor(s) 232, speed sensor(s) 234, boom height sensor(s) 235, and can include other types of sensors 236 as well. Position sensor(s) 232 are configured to determine a geographic position of machine 100 on the field, and can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. Speed sensor(s) 234 are configured to determine a speed at which machine 100 is traveling the field during the spraying operation. Speed detection can utilize sensors that sense the movement of ground-engaging elements (e.g., wheels or tracks) and/or can utilize signals received from other sources, such as position sensor(s) 232. Boom height sensor(s) 235 are configured to detect a height of a portion of the boom from the ground surface. Examples of height sensors include optical sensors, ultrasonic sensors, etc. Alternatively, or in addition, the sensors can include accelerometers, gyroscopes, inertial measurement units (IMUs), to name a few.

Control system 206 includes image processor and analysis components 238 (also referred to as image processing components 238), a spraying mode controller 240, an imaging system controller 242, a diagnostics system 243, and can include other items 244 as well. Control system 206 is configured to generate control signals to control communication system 210, sensors 220, controllable subsystems 222, or any other items in architecture 200. Controllable subsystems 222 include spraying system 102, steering system 120, propulsion system 124, machine actuators 245, and can include other items 246 as well. Spraying system 102 includes one or more pumps 247, configured to pump the agricultural substance (e.g., a liquid chemical) from tank 104 through conduits to nozzles 108 mounted on boom 110. Spraying system 102 can include other items 248 as well.

Control system 206 is configured to generate control signals to control spraying system 102 to apply the substance to identified field areas. For example, depending on where a target field area is located within an image, component 238 communicates a "spray" command to the appropriate nozzle(s) via a controller area network (CAN) bus. In one example, upon the nozzles receiving the spray command, the nozzle executes the spray command based on when it receives the command, a travel velocity of the nozzle, and other attributes that impact the spray reaching the target area. Examples include, but are not limited to, environmental conditions, plant height, etc. The nozzles are controlled to remain open for a period of time that is sufficient to cover the target area.

Machine 100 includes one or more processors or servers 250, a data store 251, and can include other items 252 as well. Data store 251 is configured to store data for use by machine 100. For example, data store 251 can store field location data that identifies a location of the field, field shape and topography data that defines a shape and topography of the field, crop location data that is indicative of a location of crops in the field (e.g., the location of crop rows), or any other data.

As also illustrated in FIG. 2, where towing machine 202 tows agricultural spraying machine 100, towing machine 202 can include some of the components discussed herein with respect to machine 100. For instance, towing machine 202 can include some or all of sensors 220, component(s) of control system 206, some or all of controllable subsystems 222 and/or some or all components of system 224. Also, towing machine 202 can include a communication system 253 configured to communicate with communication system 210, one or more processors or servers 254, a data store 256, and it can include other items 258 as well.

Image capture system 224 includes one or more image capture components 260 configured to capture images of the field, and image processing components 238 are configured to process those images. Examples of an image processing component 238 include an image signal processor or image processing module (IPM).

With reference to the example shown in FIG. 1, image capture components 260 include a plurality of cameras 130 spaced along boom 110. Each camera 130 corresponds to one or more of nozzles 108 and includes a field of view (FOV) 132 configured to image a portion 134 of the field that is to be sprayed by the corresponding nozzle(s) 108. Further, as generally represented in FIG. 1 at reference numerals 136, machine 100 includes a plurality of image processing components 136 (such as IPMs). Each image processing component 136 is configured to receive and process images from one or more of cameras 130. The following discussion will also refer to image capture components 260 as cameras 260, but it is understood that other image capture components can be utilized as well.

Referring again to FIG. 2, the captured images represent a spectral response captured by image capture system 224 that are provided to image processing components 238 and/or stored in data store 251. A spectral imaging system obtains spectral images of the field under analysis. For instance, a camera can be a multispectral camera or a hyperspectral camera, or a wide variety of other devices for capturing spectral images. The camera can detect visible light, infrared radiation, or otherwise. In one example, a vision system includes red green blue (RGB) cameras, near infra-red red green (NRG), or near infra-red (NIR) cameras.

In one example, cameras 260 include stereo cameras configured to capture still images, a time series of images, and/or a video of the field. An example stereo camera captures high definition video at thirty frames per second (FPS) with one hundred and ten degree wide-angle FOV. Of course, this is for sake of example only.

Illustratively, a stereo camera includes two or more lenses with a separate image sensor for each lens. Stereo images (e.g., stereoscopic photos) captured by a stereo camera allow for computer stereo vision that extracts three-dimensional information from the digital images. In another example, a single lens camera can be utilized to acquire images (referred to as a "mono" image).

Image processing component 238 includes an image receiver 262 configured to receive the images from image capture system 224, a geo-referencing generator 264 configured to geo-reference the images to locations in the field, a shadow corrector 266 is configured to perform shadow correction on the images, and an illumination normalizer 268 configured to normalize illumination in the image. Also, ambient lighting conditions can be acquired utilizing a white balance camera or an incident light sensor, for example. Ambient lighting conditions can be used to correct for daylight color, light direction/position, and/or lighting intensity. Further, acquired images of the targeted application/spray area can be corrected for lens distortion, tones/color correction, etc. Acquired images can be remapped or resized according to camera height and adjusted for ambient lighting conditions.

An image combiner 270 is configured to combine a number of images into a larger image of the field under analysis. For instance, image combiner 270 can stitch or mosaic the images. In order to mosaic the images, geographic location information corresponding to each of the images can be used to stitch the images together into a larger image of the field under analysis, which is then analyzed by image processing component 238. Further, the geo-referencing of images can be done automatically against the ground control points, or it can be done manually as well.

Image processing component 238 is configured to process the image data of the field acquired from the corresponding camera(s) 260 to identify plant matter in those images, and characteristics (i.e., type, health, maturity, etc.) of the plants. For example, image processing component 238 is configured to identify areas of the field that include crop plants and/or areas that include weed plants. For sake of the present discussion, a "weed" or "weed plant" refers to a non-crop plant identified in the field. That is, weeds include plant types other than crop plants (e.g., corn plants in a corn field) expected to be present in the field under consideration. In the corn field example, weeds or weed plants include plants other than corn plants.

Spatial image analyzer 272 is configured to perform spatial analysis on the images, and spectral image analyzer 274 is configured to perform spectral analysis on the images. Spatial image analyzer 272, in one example, obtains previously generated crop location data which provides a geographic location of the rows of crop plants (or the plants themselves). Spectral image analyzer 274 performs spectral analysis to evaluate the plants in the images. In one example, spectral analysis includes identifying areas in the image that have a spectral signature that corresponds to ground versus plants. For instance, spectral analysis can include a green/brown comparison.

An image segmentation component 276 is configured to perform image segmentation on a received image, to segment or divide the image into different portions for processing. A plant classifier 278, which can be trained using plant training data stored in data store 251, or obtained otherwise, is configured to identify areas in the image that represent a target plant type (e.g., crop plants, weed plants), depending on the spraying application being performed. For example, weed identification logic can identify weeds in the image, based on the image segmentation performed by image segmentation component 276. The location of plants can be stored as plant location data in data store 251. Image processing component 238 can include other items 280 as well.

Spraying mode controller 240 configured to selectively operate spraying system 102 to apply a substance (i.e., chemicals or nutrients) to the field using a plurality of different spraying modes. Examples of the substance include, but are not limited to, herbicides, fertilizers, fungicides, or other chemicals, for pest control, weed control, growth regulation, fungus control, crop nutrient support, etc.

Figures 1, 3:
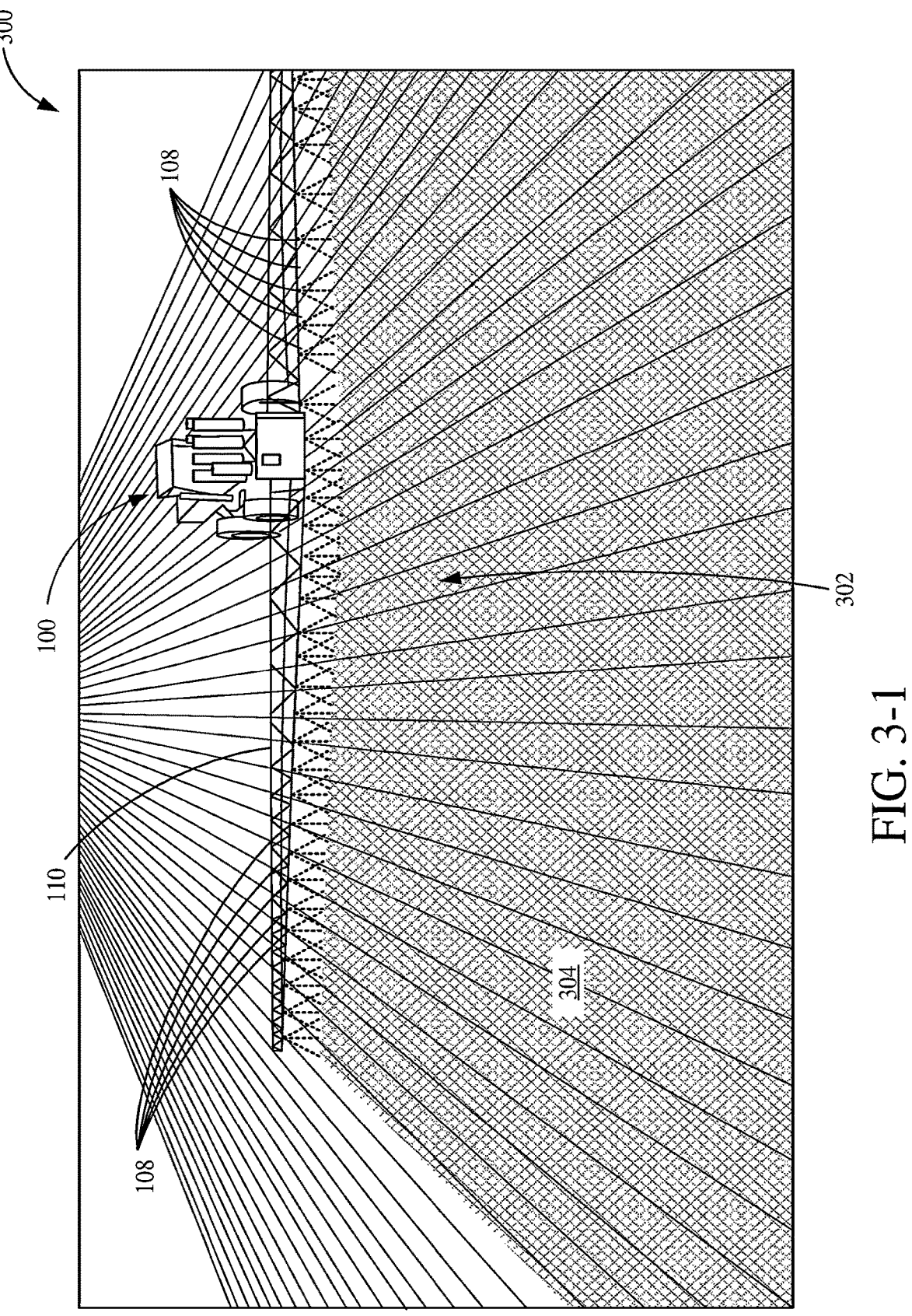
Figures 2, 3:
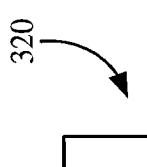

In a first spraying mode, spraying system 102 applies the substance to the field in a generally uniform pattern as agricultural spraying machine 100 traverses the field. One example is referred to as broadcast spraying, in which the nozzles are operated without identifying or targeting individual plants. FIG. 3-1 illustrates an example broadcast spraying operation 300. As shown, nozzles 108 are controlled to deliver a target or prescribed application 302 to a field 304 across the entire width of, or a portion of, boom 110. Accordingly, broadcast spraying operation 300 applies the substance to the field regardless of specific localized needs.

In some instances, broadcast spraying can result in over-spraying (e.g., applying the substance in areas where the substance is not required) or under-spraying (e.g., applying too little of the substance in areas where the substance is required). Over-spraying can result in increased production costs and a potential negative environmental yield impact. Under-spraying, on the other hand, can reduce yields due to sub-optimal substance application. For example, if an herbicide is unevenly applied or applied to incorrect plants, it is wasted in areas of over-application resulting increased production costs and a potential negative environmental yield impact, and areas of under-application experience reduced weed prevention. In some herbicide broadcast applications, for example, eighty percent of the total product is applied where it is not required.

To address at least some of these problems, spraying system 102 is controlled by controller 240 in a second spraying mode that applies the substance to targeted areas. The targeted areas are identified using images acquired by image capture system 224 and processed by image processing components 238 to identify locations of crop plants and/or weed plants, to be sprayed, within those images. An example of the second spraying mode is illustrated in FIG. 3-2, and includes an automated spraying control or precision spraying operation 320 that controls a subset of the nozzles 108 to spray precise dispersal areas 322, such as directly on a plant (crop or weed), in between plants, or otherwise, at a particular rate so that a target quantity of the substance is applied to the dispersal area. Precision spraying applications in precision farming and application techniques can reduce the use of substances, such as pesticides resulting in reduced grower costs and a reduction in environmental stress.

Figure 4:
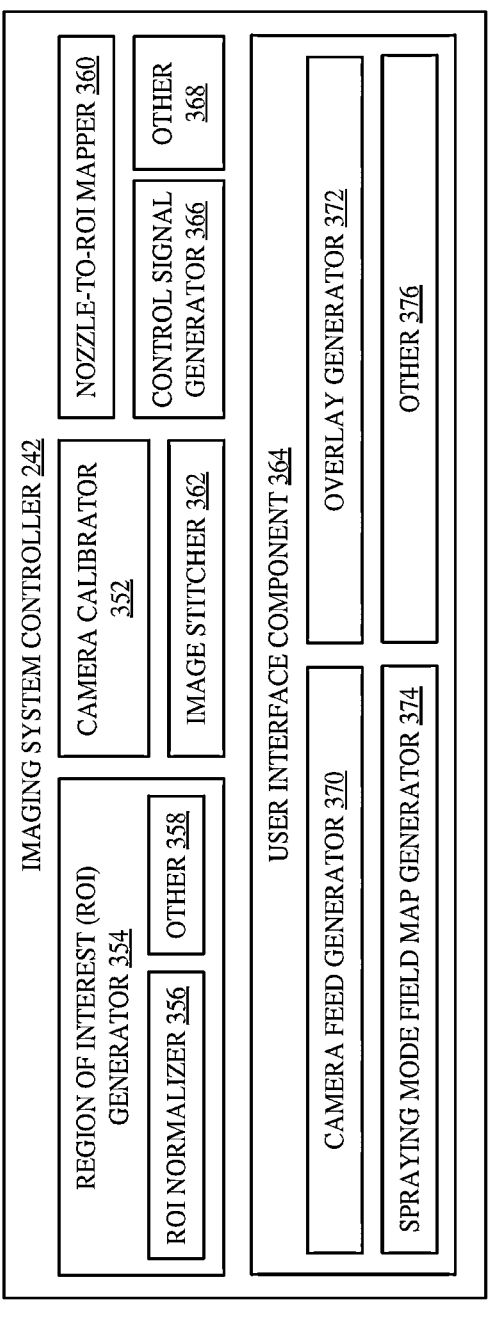
FIG. 4 is a block diagram illustrating one example of an imaging system controller.

Imaging system controller 242 is configured to control operation of image capture components 260 in capturing images of the field and to control operation of image processing components 238 in processing those images. FIG. 4 is a block diagram illustrating one example of imaging system controller 242. As shown in FIG. 4, controller 242 includes a camera calibrator 352 configured to calibrate or configure cameras 260. As discussed below, calibration of cameras 260 can include adjusting a camera FOV, changing a region of interest (ROI) within the FOV, and adjusting a camera sensitivity (e.g., adjusting the amount of image data being picked up in a given area of the field, etc.). Briefly, the ROI defines an image region within a capture image that is utilized to detect plant matter for spraying control. The ROI corresponds to the area of the field beneath the corresponding nozzles that are controlled using that ROI. In one example, other portions of the image, outside the ROI, are excluded from subsequent processing for plant detection and spraying control of the corresponding nozzles.

Controller 242 also includes an ROI generator 354 configured to generate or otherwise define ROIs corresponding to the cameras 260. ROI generator 354 can include an ROI normalizer 356, and can include other items 358 as well. ROI normalizer 356 is configured to normalize the ROI within the camera FOV based on the distance of the camera from the field surface, which can vary based on boom movement, such that the ROI corresponds to the same or similar area on the field surface regardless of boom movement. For sake of illustration, if the ROI of a particular one of cameras 130 is set to correspond to a three foot by three foot area on the field surface, ROI normalizer 356 is configured to adjust the ROI of the particular camera 130 as the boom height increases (which causes the camera 130 to move further away from the field surface) so that the area of the field represented within the adjusted ROI is approximately three feet by three feet.

Image system controller 242 also includes a nozzle-to-ROI mapper 360 that is configured to map nozzles 108 to the corresponding ROIs on the field surface. For sake of illustration, in the above example, mapper 360 is configured to generate mapping information that maps, to the particular camera, a set (one or more) of nozzles 108 that are configured to spray the three foot by three foot ROI corresponding to that particular camera.

Imaging system controller 242 also includes an image stitcher 362, a user interface component 364, a control signal generator 366, and can include other items 368 as well. Image stitcher 362 is configured to stitch images acquired from one or more of cameras 260. User interface component 364 illustratively includes a camera feed generator 370, an overlay generator 372, a spraying mode field map generator 374, and can include other items 376 as well.

FIGS. 5-1, 5-2, and 5-3 (collectively referred to herein as FIG. 5) provide a flow diagram 400 illustrating an example operation of a visualization and control system for an agricultural spraying machine. For sake of illustration, but not by limitation, FIG. 5 will be described in the context of control system 206 in architecture 200.

At block 402, a classifier model to be used by plant classifier 278 is selected or otherwise obtained based on a target plant type. The target plant type is based on the spraying operation to be performed by spraying machine 100. For example, when spraying machine 100 is to be used to spray herbicide on weeds, the plant classifier is configured to classify portions of an image as representing non-crop plants or weeds, to be targeted for precision spraying operations. In another example, a crop classifier can be used to classify areas of an image as including crop plants, and spraying system 102 can be controlled to spray the other areas of the field having plants that are not classified as the target crop type. In either case, the classifier is utilized to identify areas of the field to be sprayed for the given spraying operation.

Block 404 identifies a particular one of cameras 260 (i.e., selecting a first camera) to be calibrated and used to acquire images to be processed to control the corresponding nozzles 108 that are mapped to the ROI of that particular camera. At block 406, for the selected camera 260, a ROI is identified, within the camera FOV. The FOV for a particular camera can be defined as a default FOV, represented at block 408. Alternatively, or in addition, a FOV can be user selected, as represented at block 410.

Also, at block 412, a detection sensitivity can be identified for the selected camera 260. Again, the detection sensitivity can be a default setting, as represented at block 414, and/or user selected, as represented at block 416. The detection sensitivity controls operation of the imaging system in acquiring images and processing those images to determine the location of plants to be sprayed. For example, detection sensitivity control can include defining a camera sensitivity at block 418. For example, adjustments to the camera sensitivity can define the number of pixels acquired by the camera for a given ROI. Also, block 412 can include changes to the functionality of image processing component 238 that processes the images acquired by the particular camera 260. Changes to the plant detection sensitivity is represented at block 420. For example, functionality of image processing component 238 can define the size of the target plants that will be detected through the image processing. For sake of illustration, increases to the camera and/or plant detection sensitivity can result in the application of the agricultural substance to more areas of the field, as more plants are detected. Conversely, decreases to the camera and/or plant detection sensitivity can result in the agricultural substance being applied to less areas of the field as less target plants are detected.

At block 422, the imaging system is configured or calibrated based on the ROI and detection sensitivity identified at blocks 406 and 412, respectively. In one example, imaging system controller 242 is configured to generate control signals, using control signal generator 366, that are provided to the camera 260 and/or image processing component 238 corresponding to camera 260.

At block 424, during the spraying operation, image data indicative of a field is received by image receiver 262. As noted above, the image can be obtained in any of a wide variety of ways. For example, a single image can be obtained by the camera 260. Also, the image can include an image within a time series of still images acquired by camera 260, or an image from a video feed obtained from camera 130. Further, the image can include a stereo image (represented by block 426), a mono image 428, or other type of image 430.

At block 432, the image is preprocessed, which can include removing or correcting shadows using shadow corrector 266, as represented at block 433. Also, the image can be processed to remove illuminations using illumination normalizer 268, as represented by block 434. Of course, the image can be preprocessed in other ways as well, as represented by block 436.

At block 438, the classifier is applied to the ROI in the image to detect target plant areas to be sprayed. The detection of the target plant areas at block 438 can be based on location within the image (block 440) and/or based on color within the image (block 442). Also, as noted above, the ROI can be normalized for changes in height, as represented at block 444. Again, ROI normalization can include adjusting the portion of the image being analyzed for plant detection, to normalize the ROI for the distance of the camera to the field surface when the camera acquired the image. Of course, the detection at block 438 can be performed in other ways, as represented by block 446.

Also, it is noted that in one example image processing component 238 can obtain crop location data to augment the detection of the target plant areas. For example, crop location data can be obtained from a prior planting operation, or otherwise, and indicate the locations where crop seeds were planted, which can be indicative of the crop rows, the crop spacing within rows, etc. Using crop location data, image processing component 238 can identify the locations within the image where a crop plant is expected. Also, using crop location data, image processing component 238 can determine that plants that appear in between rows are likely to be non-crop plants. This, of course, is for sake of example only.

Also, the image processing performed by image processing component 238 can analyze RGB color vectors from a pixel clustering algorithm to determine whether an area of the image that represents a plant indicates a crop plant or a non-crop plant or otherwise identifies the plant as a target plant type to be sprayed for the particular spraying operation. The target plant areas detected in the image can then be correlated to the respective areas of the field. These areas of the field are identified as containing target plants to be sprayed. Additionally, a confidence metric is generated representing the classification of the target plant area, as represented by block 448. The confidence metric indicates the confidence in the classification of the target plant area as an area to be sprayed by the spraying operation. A high confidence metric indicates that the ROI in the image represents the target plant type and low confidence metric indicates a low confidence in the identification of the target plants.

In one example, operational characteristics of the machine are obtained at block 450. For example, operational characteristics can include indications of the machine speed and/or boom height. For example, higher machine speeds and boom heights can result in lower confidence metrics due to lower image capture quality.

Also, image processing data, such as data from an image processing module can be obtained. For example, image processing data can include image processing fault data, diagnostic information, etc. Examples are discussed in further detail below.

At block 452, the confidence metric, generated at block 448, is compared to a threshold. The threshold can be pre-defined, user-defined, or defined in other ways. In one example, as represented at block 454, the threshold is based on the detection sensitivity identified at block 412.

As shown at block 455, if the confidence metric is above the threshold, operation proceeds to block 456 in which control system 206 controls spraying system in a first spraying mode, that is based on the image data. In the present example, the first spraying mode provides image-based precision spraying, wherein selected nozzles 108 are operated to spray one or more discrete dispersal areas at block 458. An example of image-based precision spraying is illustrated above with respect to FIG. 3-2.

If the confidence metric is below the threshold at block 455, operation proceeds to block 460 in which control system 206 controls spraying system 102 to operate in a second spraying mode. In the present example, the second spraying mode provides broadcast spraying at block 462. An example is discussed above with respect to FIG. 3-1. Also, at block 464, control system 206 can generate an indication of default or fallback mode reasons. Example fallback mode reasons inform operator 228, or another user, as to why the broadcast spraying mode was utilized instead of the precision spraying mode. The information at block 464 can be generated in any of a number of ways. In one example, it is based on the operational characteristics obtained at block 450 that affected the confidence metric generation (e.g., reasons why the confidence metric was below the threshold). This, of course, is for sake of example only.

Referring again to block 454, it can be seen that changes to the detection sensitivity can increase or decrease operation in the first mode. That is, increases in the detection sensitivity can increase the confidence in the classification resulting in more frequent precision spraying mode operation. Conversely, decreases in the detection sensitivity can decrease the confidence in the classification resulting in less frequent precision spraying mode operation.

At block 466, diagnostic data can be generated by diagnostic system 243. Examples are discussed in further detail below. Briefly, however, the diagnostic data can be based on the operational characteristics obtained at block 450, and can indicate false, or other diagnostic information, as represented by block 468.

At block 470, other cameras 130 can be calibrated and utilized for image capture and control of corresponding nozzles 108. At block 472, user interface generator 231 generates a user interface to operator 228 (or other user, such as remote user 218). The user interface can display a video feed from one or more of cameras 260, as represented by block 473. For example, a single camera feed can be provided in the interface, as represented at block 474. Also, camera feeds from multiple cameras 260 can be stitched at block 475. Also, the video feed can be displayed with overlays with display elements representing configuration of the imaging system and/or spraying system, as represented by block 476. For example, an overlay can include display elements that represent the camera ROI (block 477), sensitivity (block 478), spray length/width (block 479) and can include other display elements 480 as well. In one example, an ROI display element identifies the nozzle(s) that are mapped to the particular ROI, as represented by block 481.

At block 482, the user interface display includes user input mechanisms that are configured to receive input from operator 228 (or other user) to control the imaging system and/or spraying system. For example, user input mechanisms can receive input to adjust the configuration (block 483), select the camera or cameras to display the video feed in the user interface display (block 484), or other user input mechanisms (block 485).

The user interface display can also include a diagnostics display, as represented at block 486. Examples are discussed in further detail below. Briefly, however, a diagnostics display can display an indication of the diagnostics data generated at block 466.

The user interface display can also include a field map display, that maps the spraying modes to the corresponding areas of the field, as represented by block 487. Examples are discussed in further detail below. Briefly, however, a field map display can identify areas of the field in which spraying system 102 is operated in the first spraying mode and areas of the field in which spraying system 102 operated in the second spraying mode. The field map thus displays operator 228 to easily identify how the agricultural spraying machine 100 operated as it traversed the field.

At block 488, user input through the user input mechanisms is detected. Based on the user input, the configuration of the imaging system and/or spraying system is adjusted at block 489. For example, a configuration adjustment can include changing the ROI at block 490, changing the sensitivity at block 491, changing the spray length and/or width at block 492, or other adjustments to the configuration at block 493. To adjust the configuration at block 489, control system 206 generates corresponding control signals to perform the configuration action.

At block 494, other control actions can be performed as well. Controls actions can include generating and storing a spraying map at block 495. The spraying map identifies the spraying operation (e.g., which areas of the field were sprayed and details of the spraying operation, etc.). The map can be communicated to a remote machine or system, as indicated at block 496. Of course, other control actions can be performed, as represented by block 497.

At block 498, if the spraying operation is continued, operation can return to block 404 where camera(s) 130 can be recalibrated and/or used to acquire additional images of the field to control the spraying operation.

Figures 1, 5:
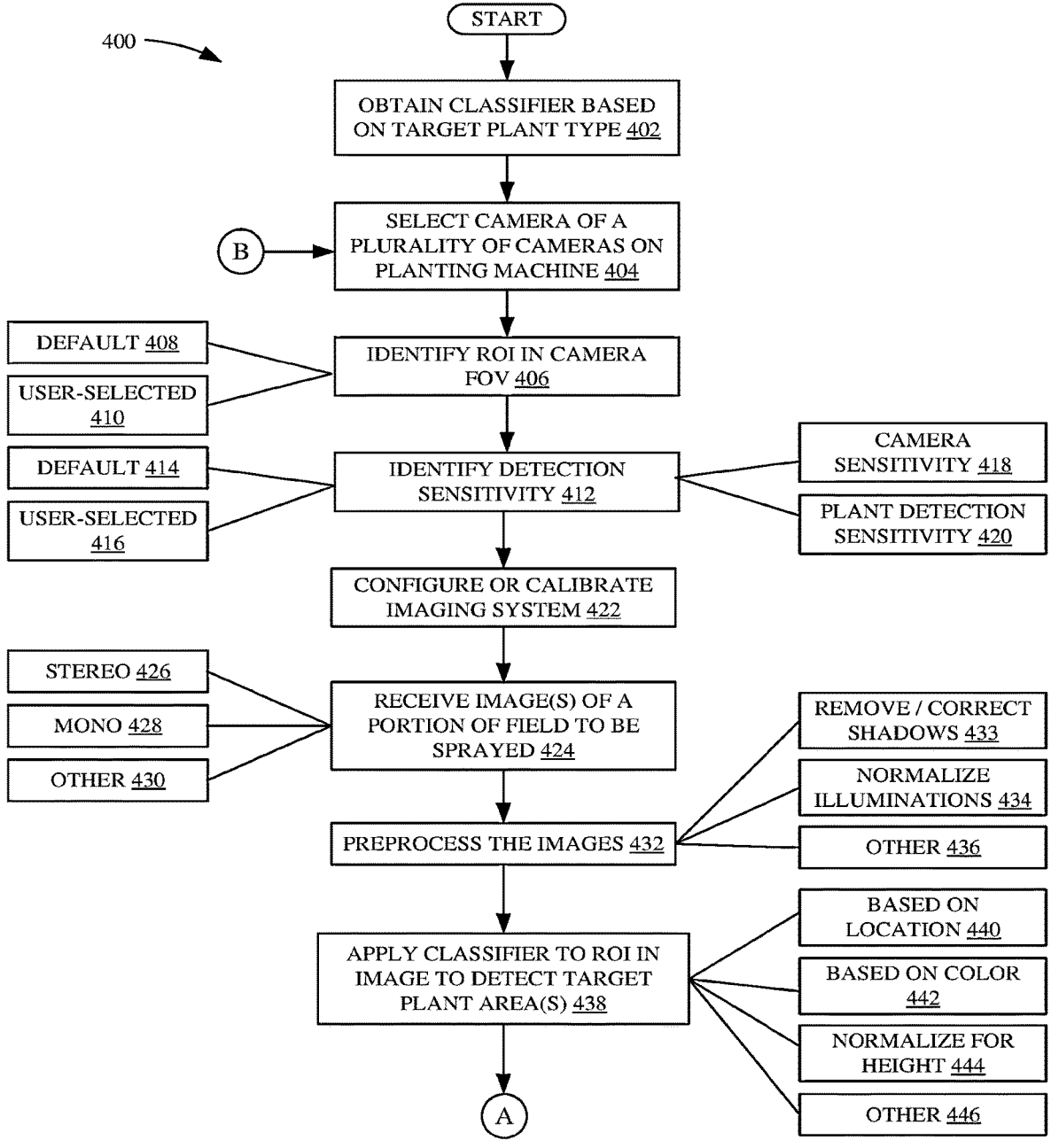
Figures 2, 5:
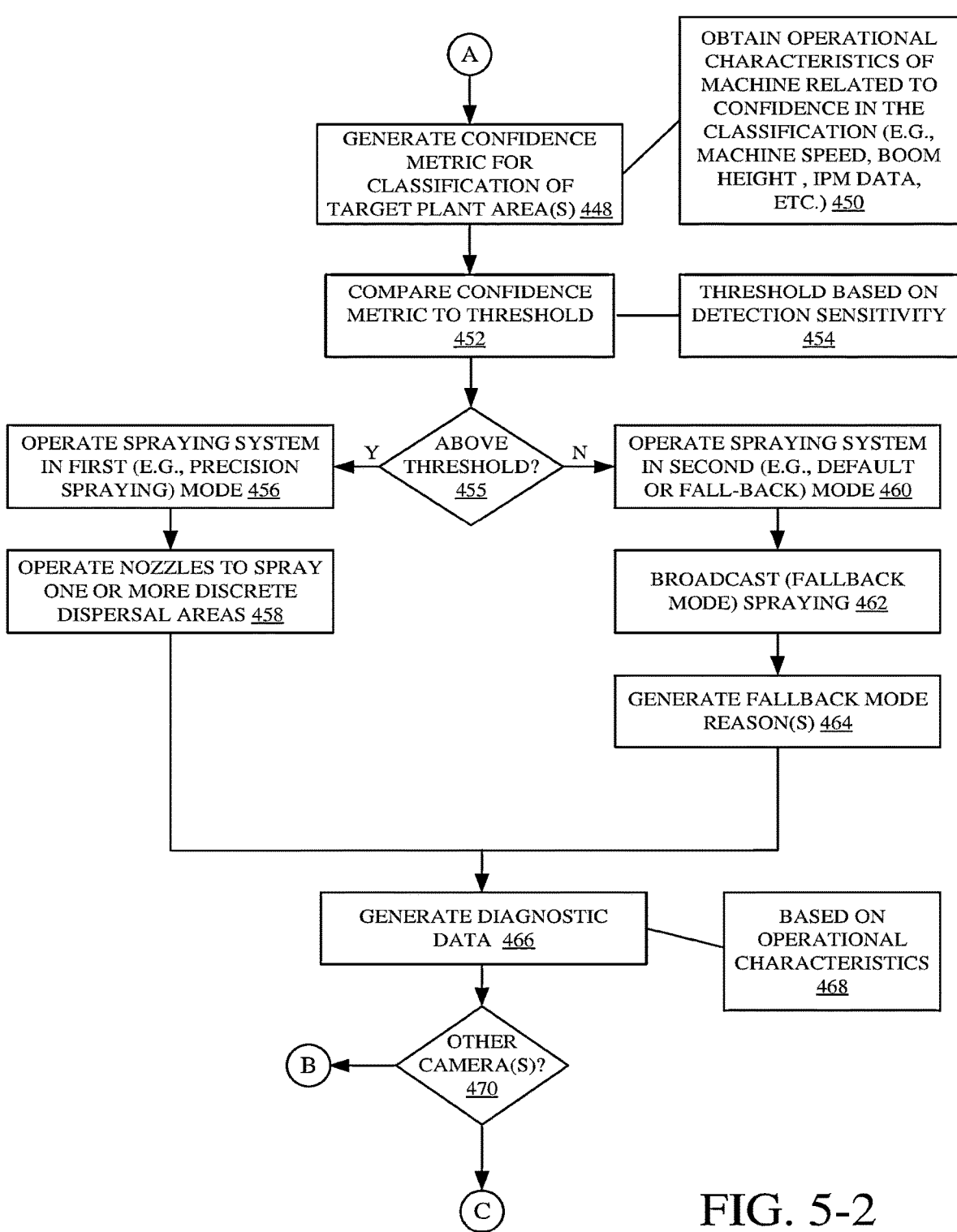
Figures 3, 5:
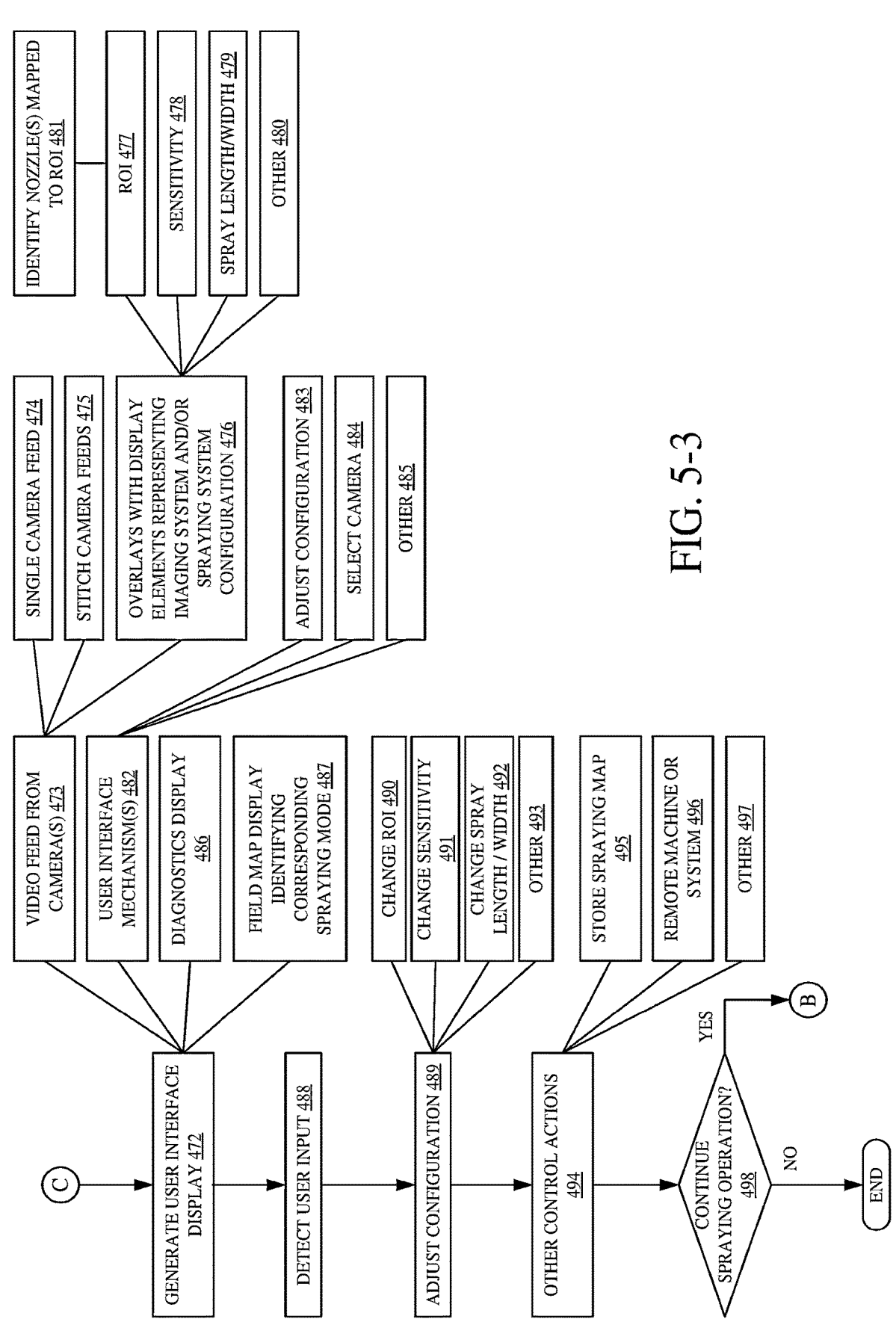
Figure 6:
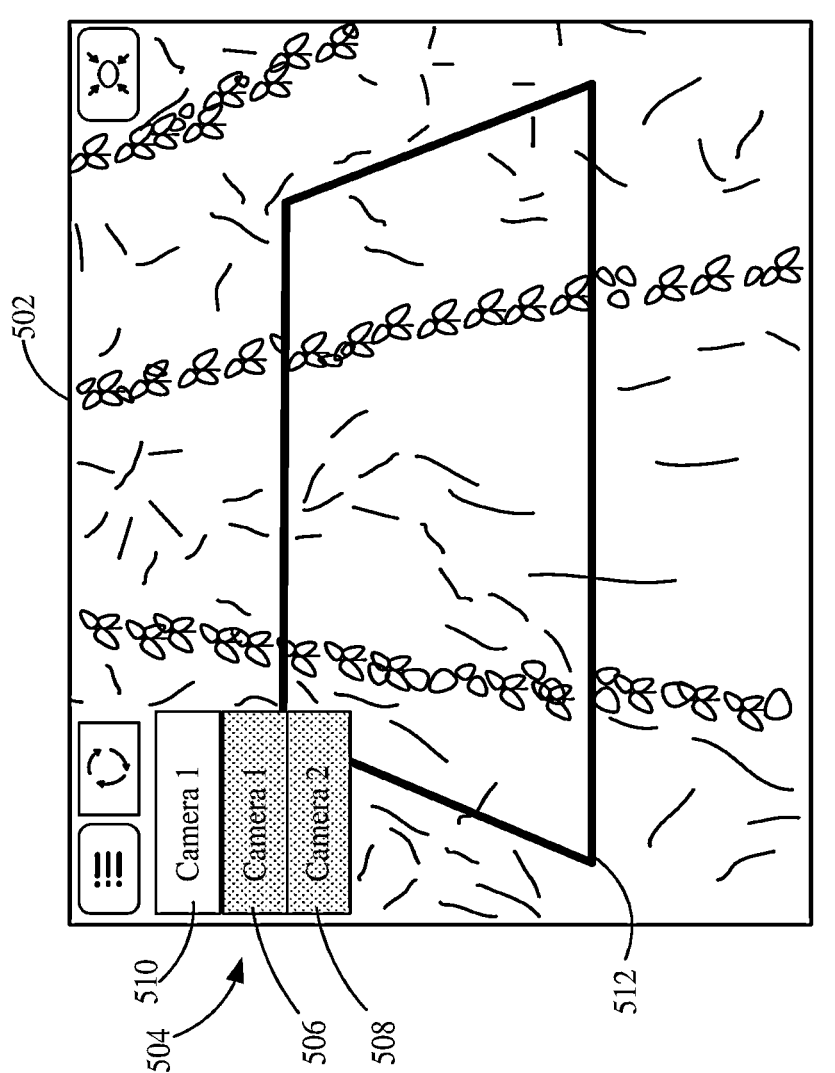
FIG. 6 illustrates one example of a user interface display.

FIG. 6 illustrates one example of a user interface display 500 generated at block 472 in FIG. 5. User interface display 500 includes an image display pane 502 that displays images, such as a video feed, from one or more of cameras 260 which can be selected using camera selection user input mechanisms 504. In the illustrated example, mechanisms 504 includes a first selection mechanism 506 actuatable to select a first one of the cameras and a second selection mechanism 508 actuatable to select a second one of the cameras. The selected camera is identified by display element 510. Input mechanism 504 thus allows the user to switch between different camera feeds in display pane 502.

In the illustrated example, display 500 also includes an ROI display element 512 that visually represents the ROI of the selected camera as an overlay on the display image. As noted above, the ROI defines the region within the image that is used by image processing component 238 to detect areas of the field to be sprayed. Thus, ROI display element 512 indicates how the system is operating to capture and process images.

In one example, ROI display element 512 includes an ROI modification user input mechanism that is actuatable to modify the ROI. For example, the user can drag and drop (or otherwise move) ROI display element 512 on the display image. Alternatively, or in addition, the user can change the size of ROI display element 512. In either case, ROI generator 354 adjusts the corresponding ROI used for the selected camera. Accordingly, the user can shrink or enlarge the ROI and/or move the ROI (e.g., horizontally or vertically on the display) to change the corresponding ROI relative to the nozzles mapped to the ROI.

Figure 7:
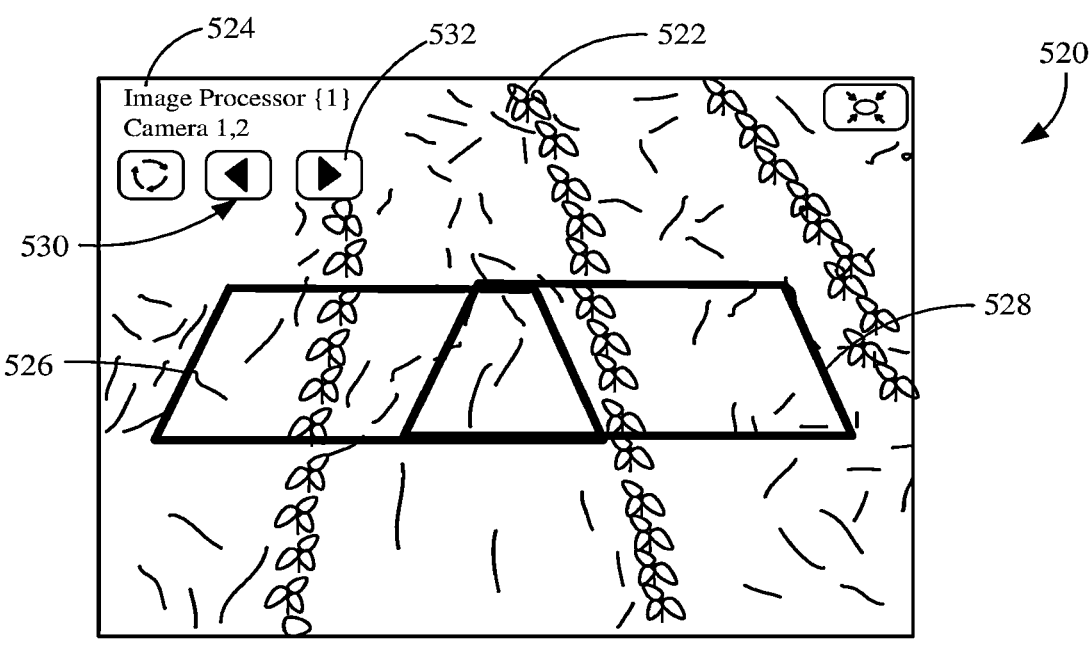
FIG. 7 illustrates one example of a user interface display.

FIG. 7 illustrates one example of a user interface display 520 that displays images obtained from multiple cameras. A first image is obtained from a first camera (referred to as "camera 1" in the illustrated example) and a second image is obtained from a second camera (labeled "camera 2"). The images are stitched by image stitcher 362 and displayed in display pane 522. Display element 524 identifies the cameras, as well as the particular image processing component 238 (labeled "image processor 1") that processes the received image data.

Also, display 520 includes a first ROI display element 526 that visually represents the ROI corresponding to the first camera and a second ROI display element 528 that visually represents the ROI corresponding to the second camera. Display elements 526 and 528 allows the user to determine whether the ROIs are properly calibrated or aligned relative to the area of the field. As discussed above with respect to FIG. 6, user interface display 520 can include ROI modification user input mechanisms that are actuatable to modify one or both of the ROIs.

Figure 8:
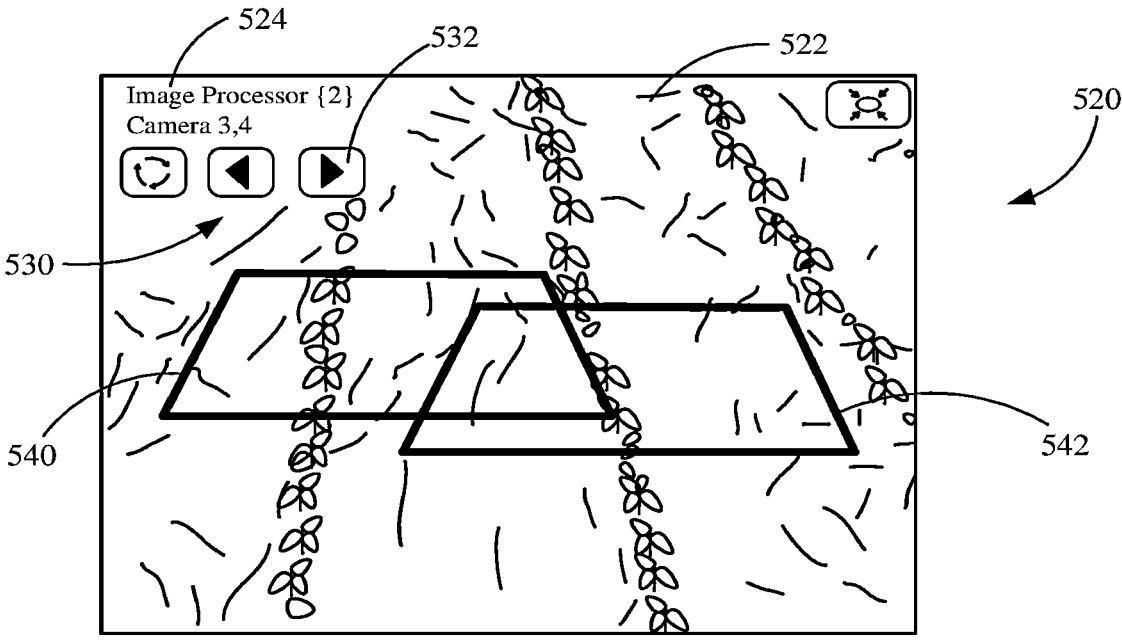
FIG. 8 illustrates one example of a user interface display.

Display 520 includes a camera selection user input mechanism 530 that is actuatable to switch between different camera views. For example, actuation of button 532 toggles display 520 to a stitched view of third and fourth cameras, as shown in FIG. 8. In FIG. 8, display pane 522 displays a stitched image from a different set of cameras (illustratively "camera 3" and "camera 4"), which is identified by display element 524. Display element 524 is also updated to identify the image processing component 238 that processes those images.

In illustrated in FIG. 8, the ROIs represented by display elements 540 and 542 are offset from one another, which indicates an inaccurate calibration. Thus, the user is able to visualize the calibration error, and adjust the ROIs accordingly using the ROI modification user input mechanisms.

Figure 9:
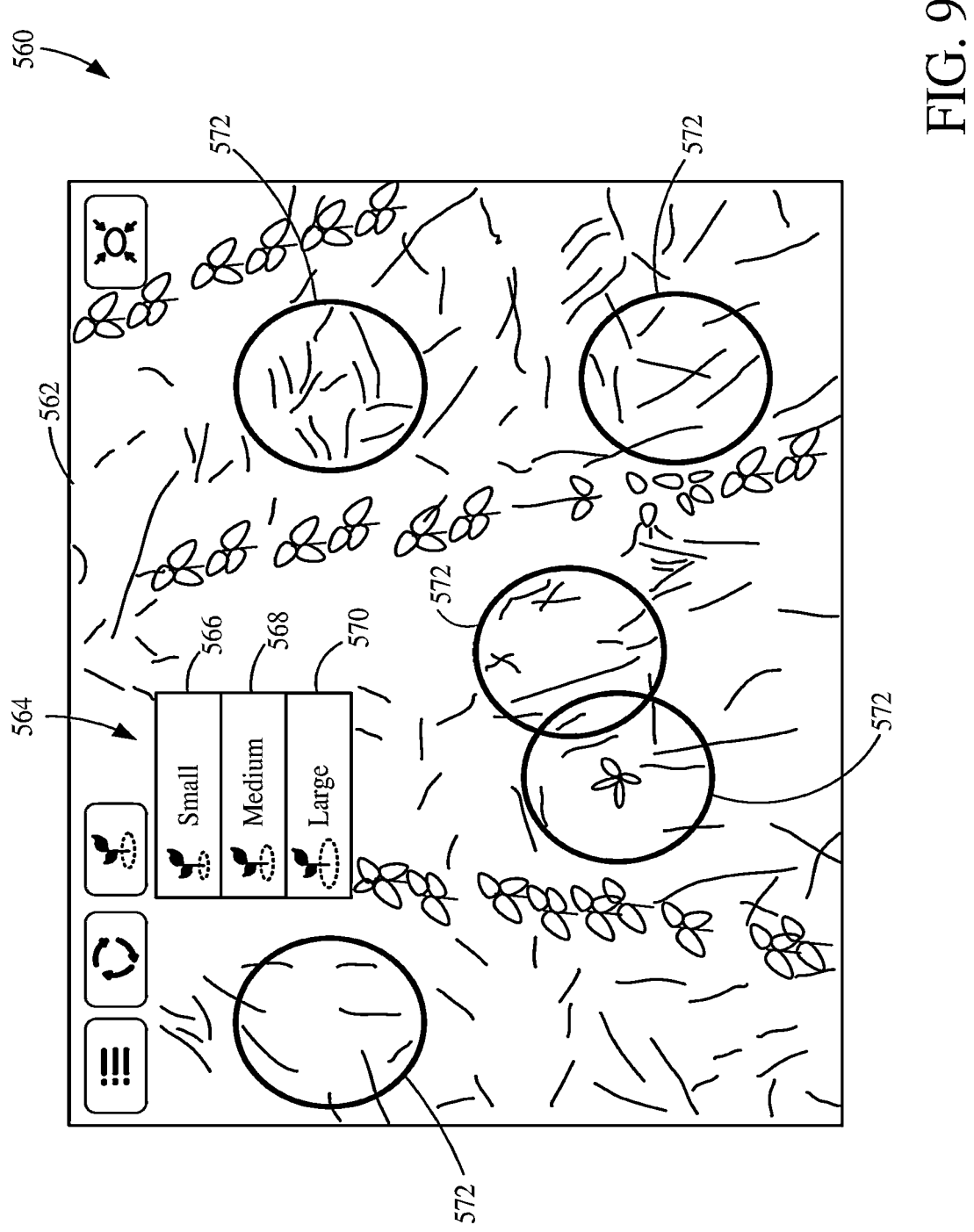
FIG. 9 illustrates one example of a user interface display.

FIG. 9 illustrates an example user interface display 560 that includes a display pane 562 that displays a camera feed from one or more cameras. User interface display 560 includes a user input mechanism 564 that is actuatable to select a detection sensitivity (e.g., a granularity in the image data used to detect target plant types), as discussed above with respect to block 412 in FIG. 5. User input mechanism 564 includes a first display element 566 actuatable to select a first (i.e., high) sensitivity setting, a second display element 568 actuatable to select a second (i.e., medium) sensitivity setting, and a third display element 570 actuatable to select a third (i.e., low) sensitivity setting.

With the high detection sensitivity corresponding to display element 566, high field level detail is obtained allowing the system to detect smaller plant sizes. In other words, increasing the sensitivity can detect smaller plants, resulting a higher number of dispersal areas (i.e., increasing the amount of substance being sprayed on the field). Conversely, actuation of display element 570 decreases the sensitivity, thus increasing the size of the plants detected by control system 206. Thus, the decreased sensitivity decreases the number of areas identified to be sprayed. Also, display 560 includes display elements 572 that identify where, within the image, the target plant areas have been identified. A size of display element 572 represents the size of the plant area that is detected.

Figure 10:
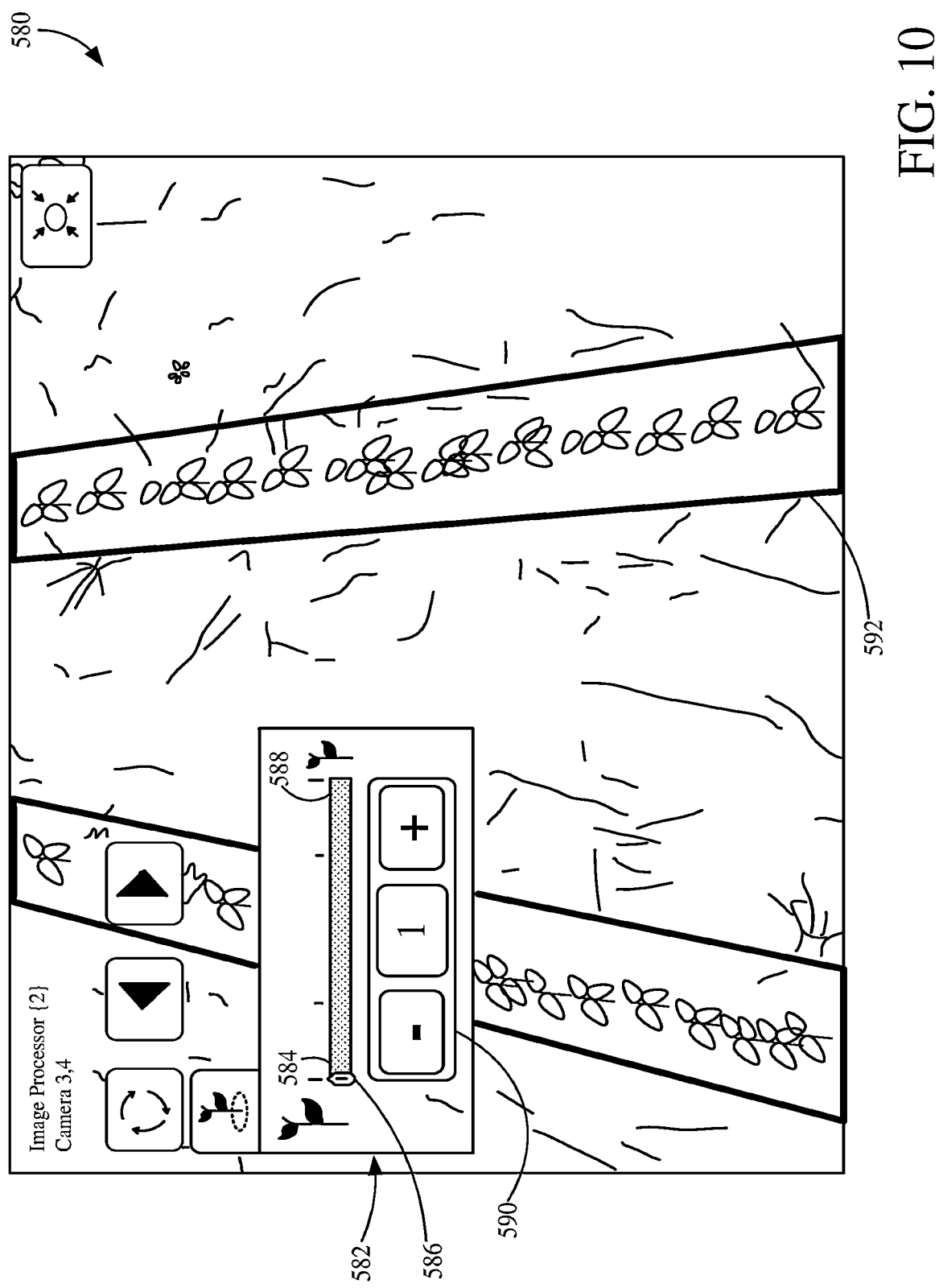
FIG. 10 illustrates one example of a user interface display.

FIG. 10 illustrates another example of a user interface display 580 including a sensitivity adjustment user input mechanism 582. Mechanism 582 includes a slider control 584 that is movable within a window or control bar having a first end 586 (corresponding to decreased detection sensitivity) and a second end 588 corresponding to a higher detection sensitivity. Slider control 584 is movable between a plurality of discrete slider positions by dragging slider control 584 and/or using an actuator 590. Also, display 580 includes a display element 592 that visually identifies the area detected within the image. For instance, increasing or decreasing the sensitivity illustratively changes the width of the spray pattern.

Figure 11:
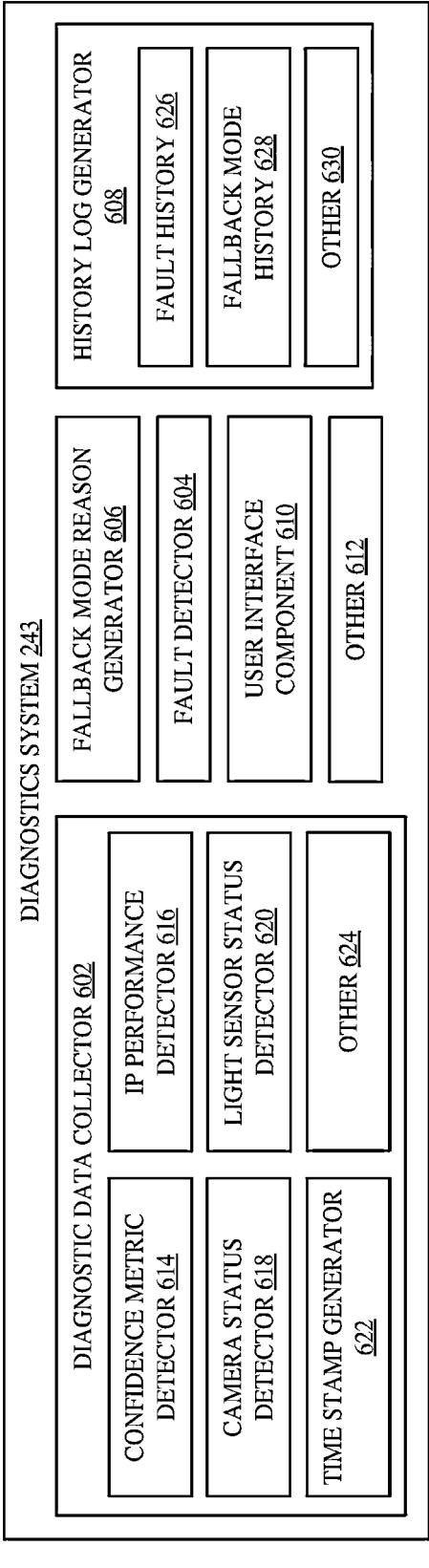
FIG. 11 is a block diagram illustrating one example of a diagnostics system.

FIG. 11 illustrates one example of diagnostics system 243. In the illustrated example, diagnostics system 243 includes a diagnostic data collector 602, a fault detector 604, a fallback mode reason generator 606, a history log generator 608 a user interface component 610, and can include other items 612 as well.

Diagnostic data collector 602 is configured to collect diagnostic data from image capture system 224 and/or image processing components 238. Illustratively, collector 602 includes a confidence metric detector 614 configured to detect or otherwise identify the confidence metrics generated by image processing component 238. Collector 602 also includes an image processing performance detector 616 configured to detect performance of image processing component 238. For example, performance can include status of image processing modules relative to the image processing of the video feeds from cameras 260. Examples include, but are not limited to, indications of over-voltage or under-voltage conditions, or other fault conditions that can be detected by fault detector 604. A camera status detector 618 is configured to detect camera status information from cameras 130. Light sensor status detector 620 is configured to detect the status of light sensors. For example, changes in the lighting can affect the ability of the image processing. In one example, one or more light sensors are positioned along the length of boom 110 and are configured to detect lighting conditions. Light sensors can detect levels of illumination that are below a threshold, which can indicate quality or confidence in the image detection. Light sensor status detector 620 is configured to receive signals from the light sensors, to indicate whether they are functioning properly as well as the lighting information which can be utilized to diagnose low confidence scores or other fault conditions.

Diagnostic data collector 602 also includes a timestamp generator 622, and can include other items 624 as well. Timestamp generator 622 is configured to generate timestamps for the diagnostic data collected by collector 602. Using the timestamp generator 622, history log generator 608 can generate a history log, with timestamped diagnostic data, which can be surfaced to operator 228 in a diagnostic user interface display. One example of a diagnostic user interface that can be generated by user interface component 610 is discussed below.

History log generator 608 can include a fault history generator 626, a fallback mode history generator 628, and can include other items 630 as well. Fault history generator 626 is configured to generate a fault history, which can be then surfaced to operator 228 or other user. Similarly, a fallback mode history generated by fallback mode history generator 628 can be surfaced to operator 228 or other user as an indication of when a default spraying mode was entered, e.g. due to low confidence scores.

Figure 12:
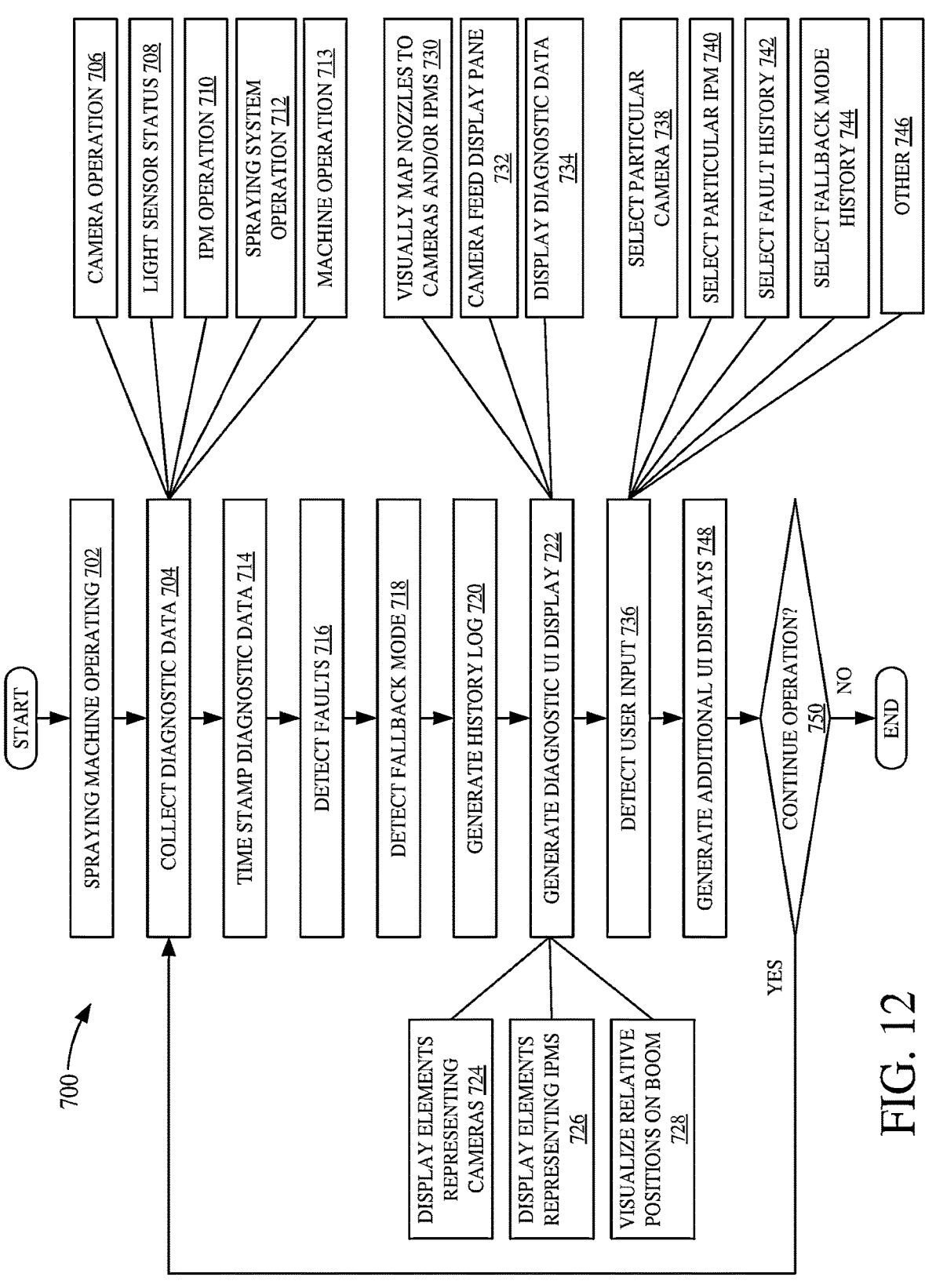
FIG. 12 provides a flow diagram illustrating one example of operation of an agricultural machine in obtaining and visualizing diagnostic data relative to image-based spraying operations.

FIG. 12 is a flow diagram 700 illustrating one example of operation of an agricultural machine in obtaining and visualizing diagnostic data relative to image-based spraying operations. For sake of illustration, but not by limitation, FIG. 12 will be described in the context of diagnostics system 243 discussed above with respect to FIG. 11.

At block 702, spraying machine 100 is operating in a field. Spraying system 102 is selectively operated between first and second modes as machine 100 traverses the field based on image-based plant classification and corresponding confidence metrics. When one or more of image processing components 238 detect target plant areas with high confidence (confidence metrics above the threshold), the system is operated in a first, precision spraying mode. When machine 100 is in areas in which image processing components 238 have low confidence, spraying system 102 is operated in a second, broadcast (or other default) spraying mode. During the operations, diagnostic data is collected at block 704. For example, diagnostic data collector 602 collects diagnostic or other operational data regarding the operation of cameras 130, as represented at block 706. As represented at block 708, light sensor status information can be obtained indicating operational status of light sensors utilized to detect illumination conditions. Also, diagnostic data representing operation of image processing components 238 (such as image processing modules or IPMs) can be obtained, as represented by block 710. For example, diagnostic data can indicate electrical operation such as operational voltage, low light conditions, or other fault-related conditions. The diagnostic data can also indicate communication errors encountered by communication system 210.

The diagnostic data can indicate operation of spraying system 102, as represented by block 712. For example, the diagnostic data can indicate nozzle performance, boom height, or any other spraying system related information. At block 713, the diagnostic data can indicate operation of spraying machine 100, such as speed information, position information, operational performance of the machine actuators 245, steering system 120, propulsion system 124, or other items 246.

At block 714, timestamp generator 622 timestamps the diagnostic data to indicate the time at which it is collected and/or was detected by spraying machine 100. At block 716, one or more fault conditions are identified based on the timestamped, diagnostic data. For example, the diagnostic data can be compared to known fault conditions. A model of fault characteristics can be applied to the diagnostic data, or faults can be detected in other ways as well.

At block 718, fallback mode reason generator 606 determines that the fallback, or default mode, was activated in one or more instances. For example, generator 606 can identify a location in the field at which spraying system 102 is activated to broadcast spray the agricultural substance. At block 720, history log generator 608 generates a diagnostic history log. The history log includes a plurality of log entries that each represent a portion of the collected diagnostic data.

At block 722, a diagnostic user interface display is generated to represent the diagnostic data. Examples of a diagnostic user interface display are discussed below with respect to FIGS. 13-17. The diagnostic user interface display can include, for example, display elements representing cameras 260 (block 724), and/or display elements representing image processing components 238 (block 726) visually associated with the corresponding cameras. For example, as indicated at block 728, the display elements can visualize the relative positions of the cameras and/or image processing components 238 on boom 110.

As represented at block 730, the diagnostic user interface display can visually map nozzles 108 to the cameras 260 and/or image processing components 238. Also, the diagnostic user interface display can include a camera feed display pane (block 732) that displays a camera feed from one or more of cameras 260. The display can also display the diagnostic data in association with the relevant cameras, image processing components, nozzles, etc., as represented at block 734.

At block 736, user input is detected through the user interface display. For example, the user input can select a particular camera at block 738. Also, the user input can select a particular image processing component at block 740. Also, the user input can select a fault history, at block 742, or a fallback mode history at block 744. Other inputs can be received as well, as represented at block 746.

At block 748, additional user interface displays can be generated based on the user input at block 736. For example, additional information can be rendered to operator 226 based on user selection of components through the diagnostic user interface display. At block 750, operation is continued to collect additional diagnostic data during the spraying operation.

Figure 13:
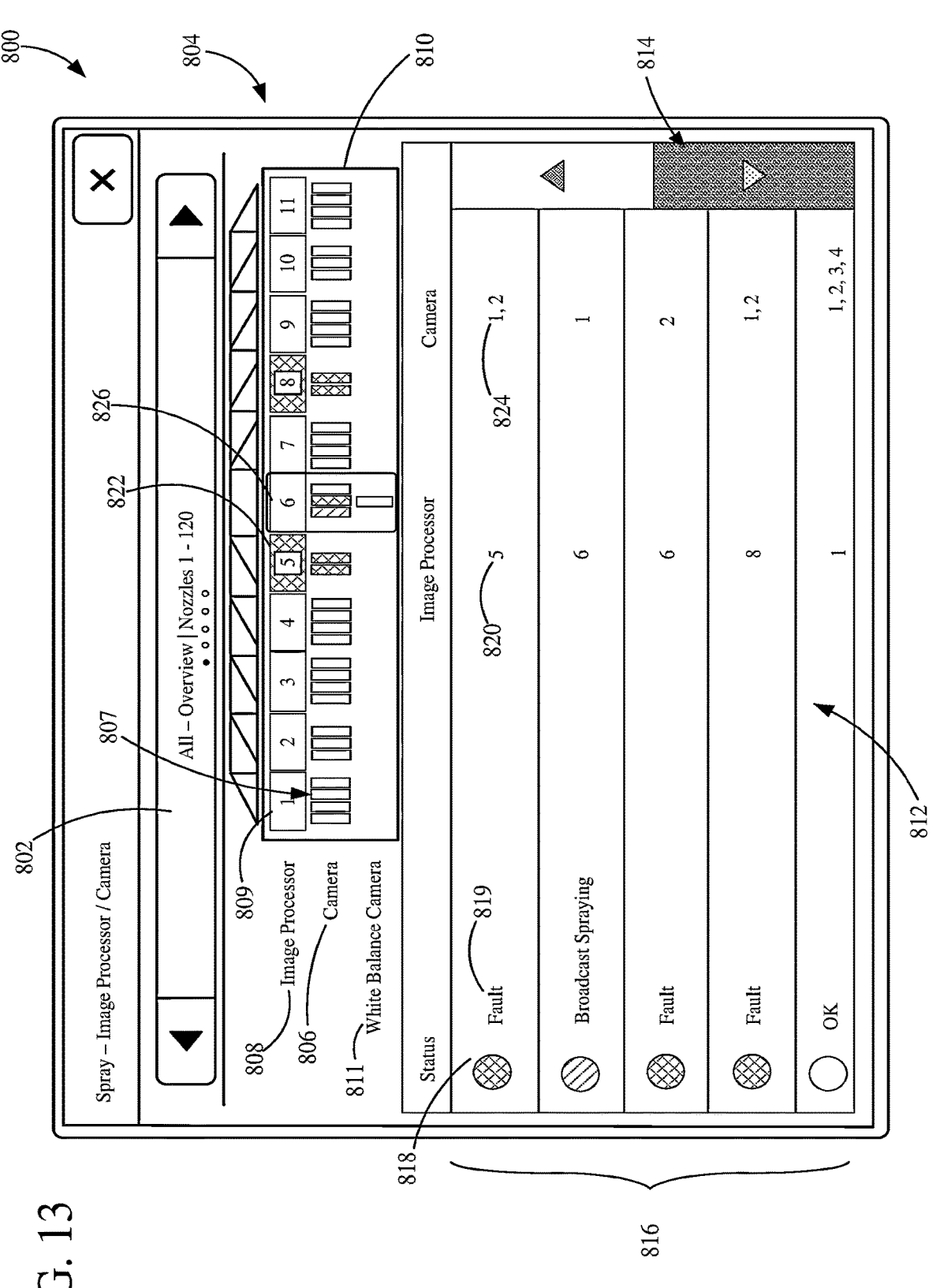
FIG. 13 illustrates one example of a user interface display.

FIG. 13 illustrates an example diagnostic user interface display 800 generated at block 722. Display 800 includes a user input mechanism 802 for selecting one or more portions of the imaging system to display diagnostic data. In the example of FIG. 13, display 800 includes a display element 804 that represents boom 110 and the corresponding positions of cameras 260 (represented by display elements 806) as well as the corresponding locations of imaging processing components 238 (represented by display elements 808).

For each image processor represented by a display element 808, display 800 includes one or more display elements that indicate an operational status of each camera processed by that image processor. For example, display element 807 includes four color-coded bars representing four cameras processed by the image processor represented by display element 809 (labeled "image processor 1" in the present example). The color of the particular color-coded bar corresponding to a given camera indicates the operational (e.g., fault) status of that given camera. For example, a green indicator can indicate a normal operational status, a yellow indicator can indicate a detected issue, and a red indicator can indicate a fault condition. This, of course, is for sake of example only. Also, a display element 811 indicates light sensor status. In the present example, a single light sensor is utilized at a center portion of the boom, as indicated by reference numeral 813.

User interface display 800 includes one or more drill-down user input mechanisms that are actuatable to drill-down into specific portions of the imaging system. For example, the user can actuate mechanism 802 to change to a display that represents only a subset of the nozzles and image processors. In another example, a user can actuate the display element 808 representing a particular image processor.

In the example of FIG. 13, control system 206 includes eleven image processing components 238 (e.g., IPMs or other image processors), each having at least one corresponding camera 260. A bounding box 810 identifies the portion of machine 100 selected by input mechanism 802. Also, mechanism 802 identifies which nozzles (all nozzles 1-120 in the illustrated example) are selected.

Display pane 812 displays diagnostic data pertaining to the selected set of IPMs, represented by display elements 808, in a scrollable list that is scrollable using input mechanisms 814. A plurality of entries 816 are displayed, with each entry 816 representing a particular portion of the diagnostic data. For example, a first entry 818 includes a description 819 and an image processor identifier 820 identifying that a fault condition has been identified relative to "image processor 5", represented by display element 822. Camera identifier 824 identifies the corresponding cameras.

Figure 14:
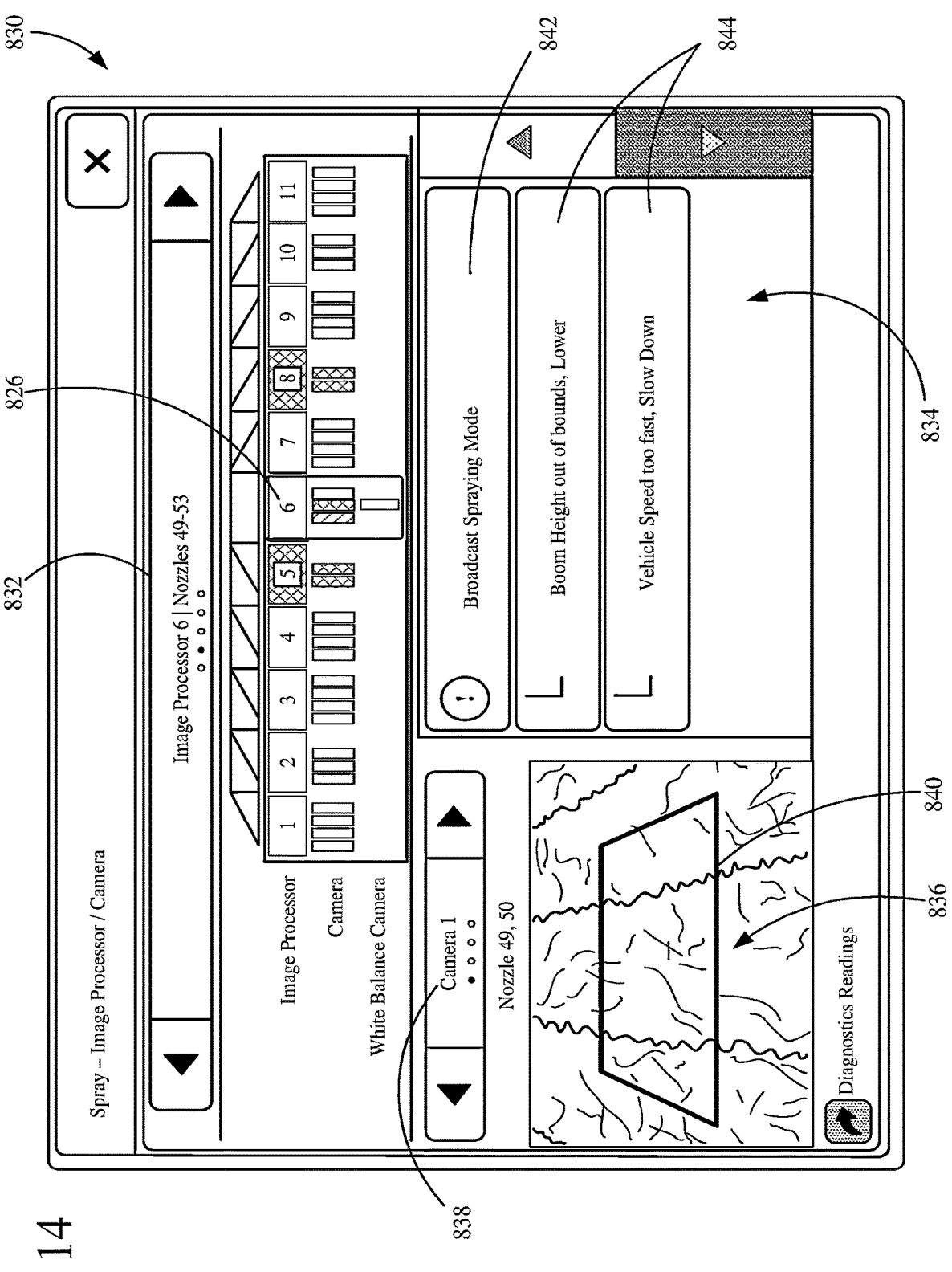
FIG. 14 illustrates one example of a user interface display.

FIG. 14 illustrates one example of a user interface display 830 that is displayed when a user selects "image processor 6" at reference numeral 826 in FIG. 13. Display 830 includes a display element 832 that identifies which image processors and nozzles are being represented by the diagnostic data in display pane 834. Also, display 830 can include a camera feed display pane 836 that displays an image or video feed from cameras associated with the selected image processor. Where multiple cameras are associated with the selected image processor, a user input mechanism 838 can be provided to allow the user to select between the plurality of cameras. The view from the selected camera is displayed in pane 836. Also, display pane 836 can include an ROI display element 840 that represents the ROI of the selected camera.

Also, for the selected image processor, display pane 834 includes a spraying mode display element 842 that identifies the current spraying mode of the selected image processor. In the present example, the nozzles corresponding to the selected image processor (i.e., nozzles 49-53) are identified as being in a broadcast spraying mode. Also, display pane 834 can include one or more display elements 844 that identify reasons for the broadcast spraying mode, along with recommended corrective actions, such as lowering the boom, slowing the machine speed, etc.

Figure 15:
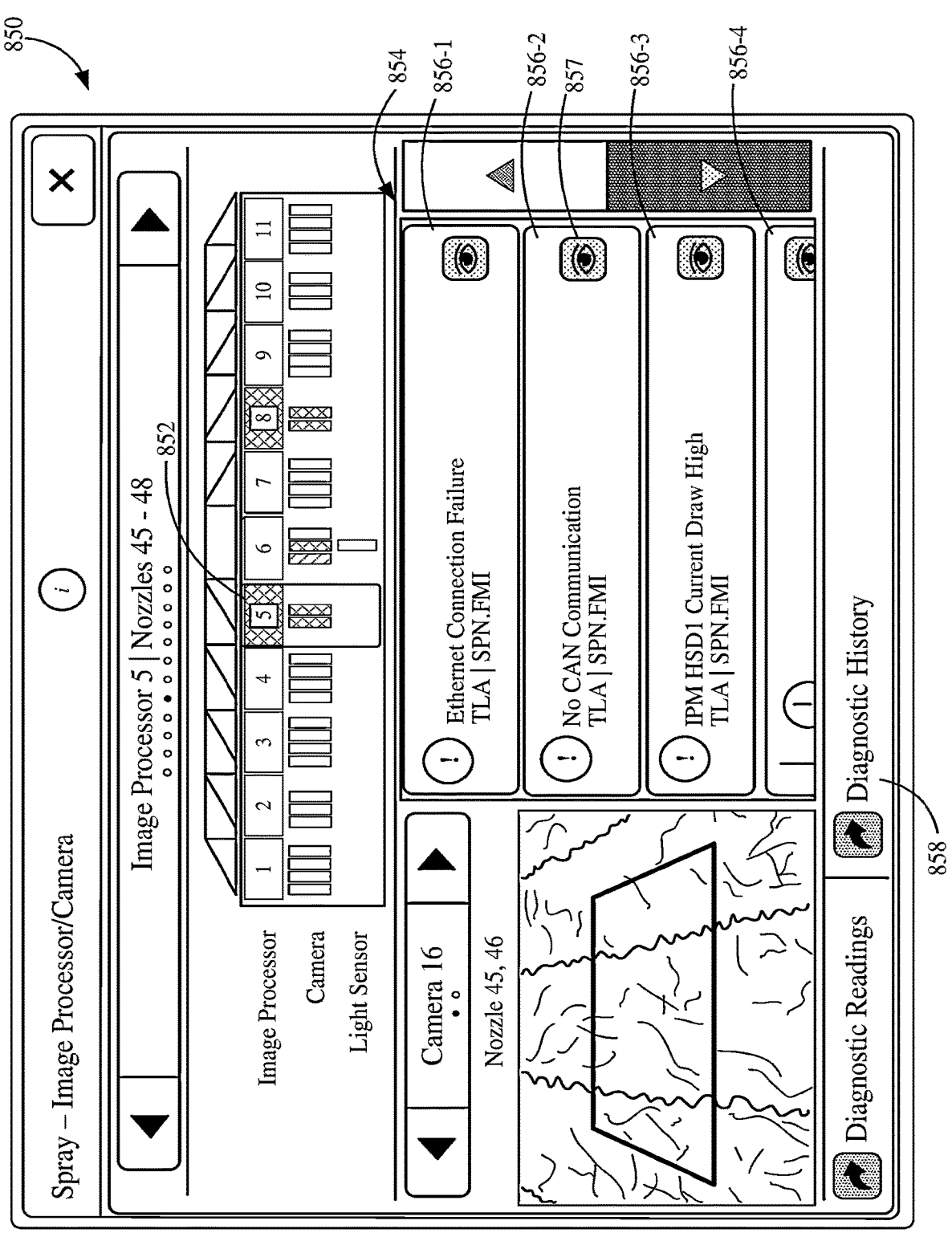
FIG. 15 illustrates one example of a user interface display.

FIG. 15 illustrates another example of a user interface display 850 that is displayed for a selected image processor 852. Display 850 includes a display pane 854 that includes a plurality of entries 856-1, 856-2, 856-3, and 856-4 (collectively referred to as entries 856) in a scrollable list. Each entry 856 represents a diagnostic instance associated with the selected image processor 852, such as fault conditions, errors, or other issues in display pane 854, and includes a details actuator 857 that is actuatable to display additional information for the diagnostic instance. In the example of FIG. 15, entry 856-1 indicates that image processor 852 has experienced an ethernet connection failure, entry 856-2 indicates that there is no CAN bus connection, and entry 856-3 indicates that the selected image processor is experiencing a high current draw.

Figure 16:
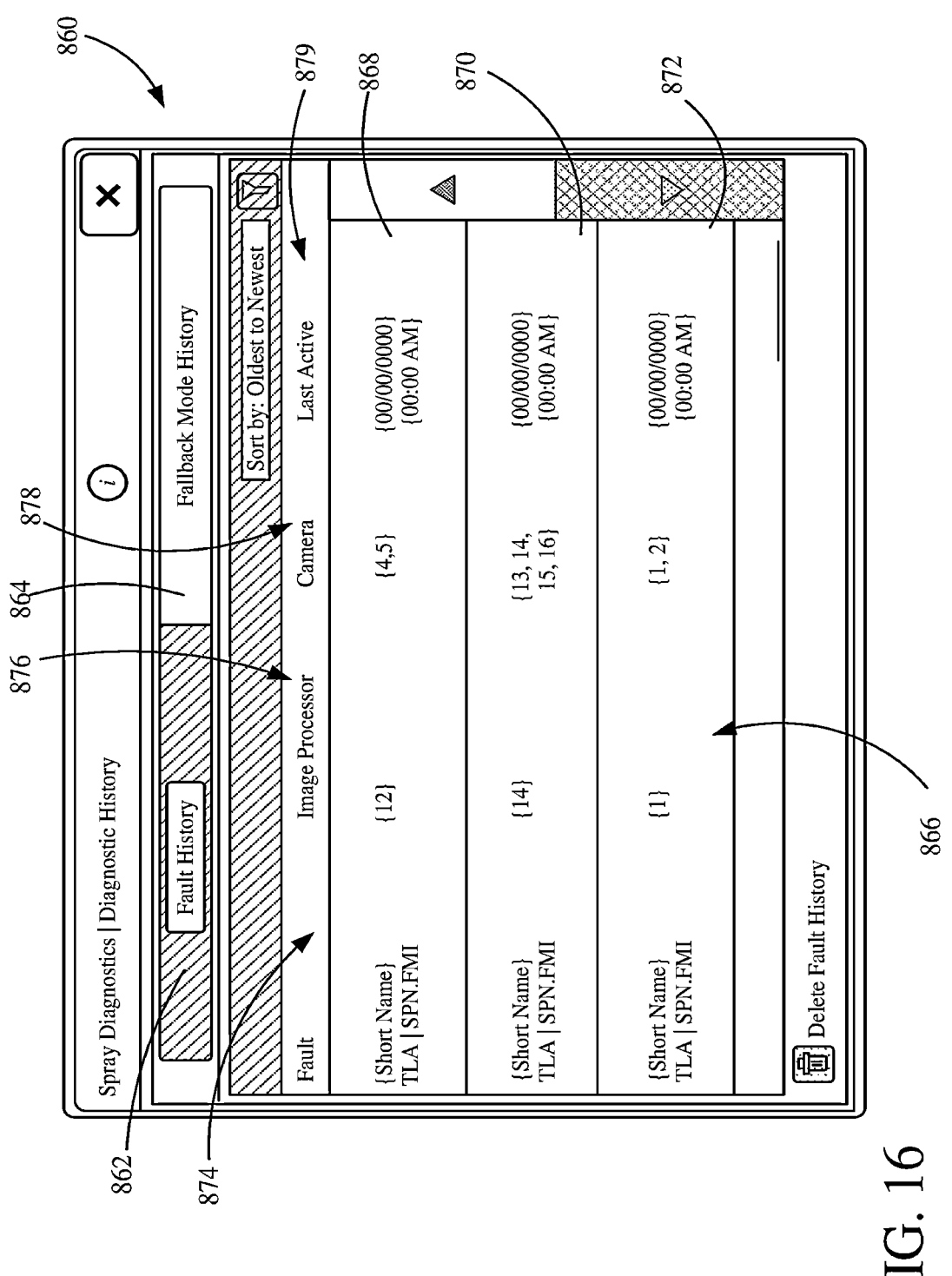
FIG. 16 illustrates one example of a user interface display.

Display 850 also includes a diagnostic history selection element 858 that is actuatable to display a diagnostic history user interface display, such as display 860 shown in FIG. 16. Display 860 includes a user input mechanism 862 that is actuatable to select a fault history display and a user input mechanism 864 that is actuatable to select a fallback mode history.

In FIG. 16, mechanism 862 is actuated and a fault history is displayed in display pane 866. Display pane 866 includes a plurality of display entries 868, 870, and 872. Each display entry includes a description element 874, an identifier element 876 that identifies the corresponding image processor, a camera identifier element 878 that identifies the corresponding camera, and a timestamp element 879 that identifies the time of the detected fault.

Figure 17:
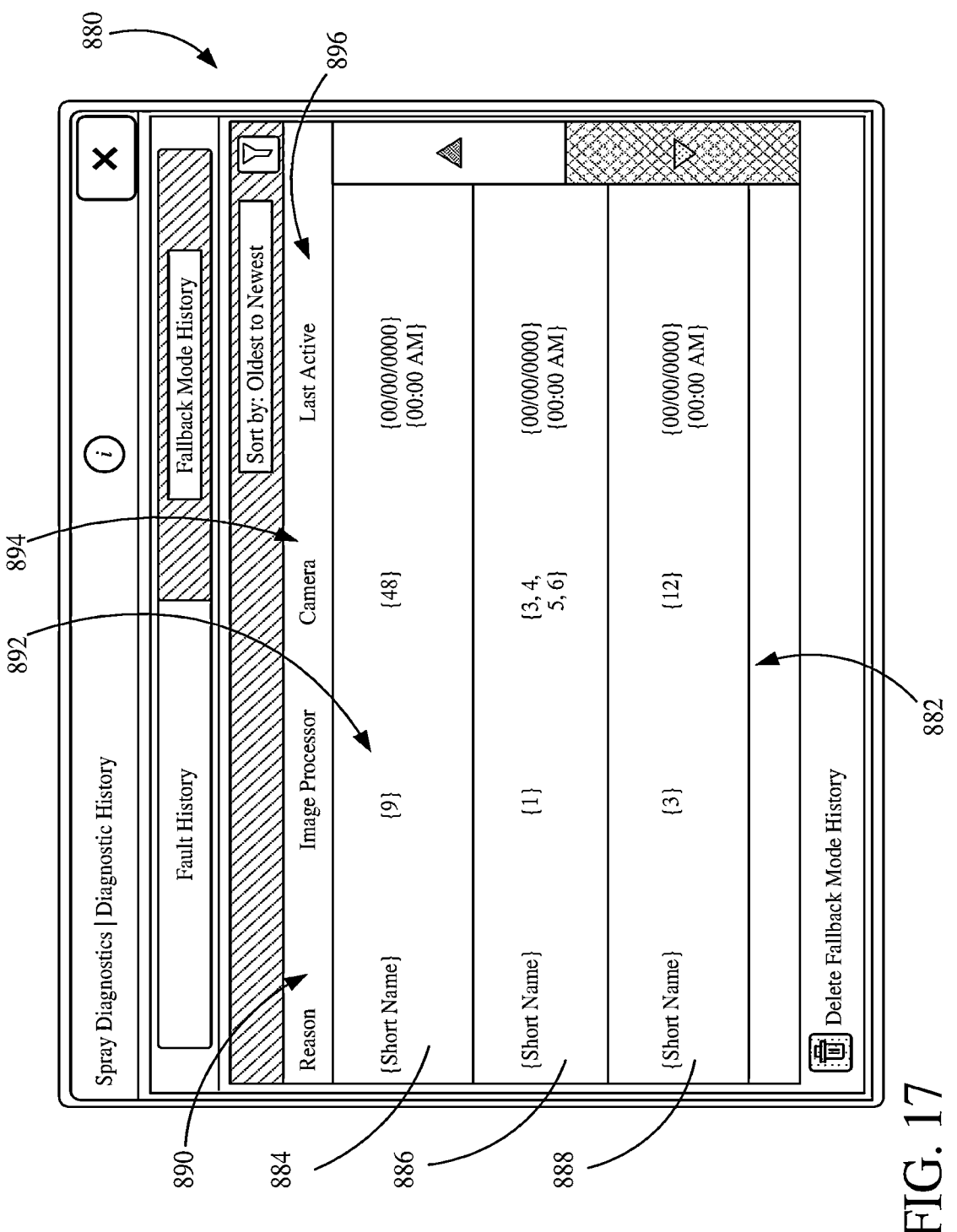
FIG. 17 illustrates one example of a user interface display.

FIG. 17 illustrates an example user interface display 880 that is displayed when mechanism 864 is actuated. Display 880 includes a display pane 882 displays a history of fallback or default mode (e.g., broadcast spraying mode) operation. Each display entry 884, 886, and 888 identifies an instance of broadcast spraying and includes a description element 890, an image processor identifier element 892 that identifies the relevant image processor, a camera identifier element 894 that identifies the corresponding camera, and a timestamp element 896 that identifies a time when the fallback mode, represented by the entry, occurred. In one example, the description element 890 identifies to operator 228 one or more reasons for occurrence of the fallback mode.

Figure 18:
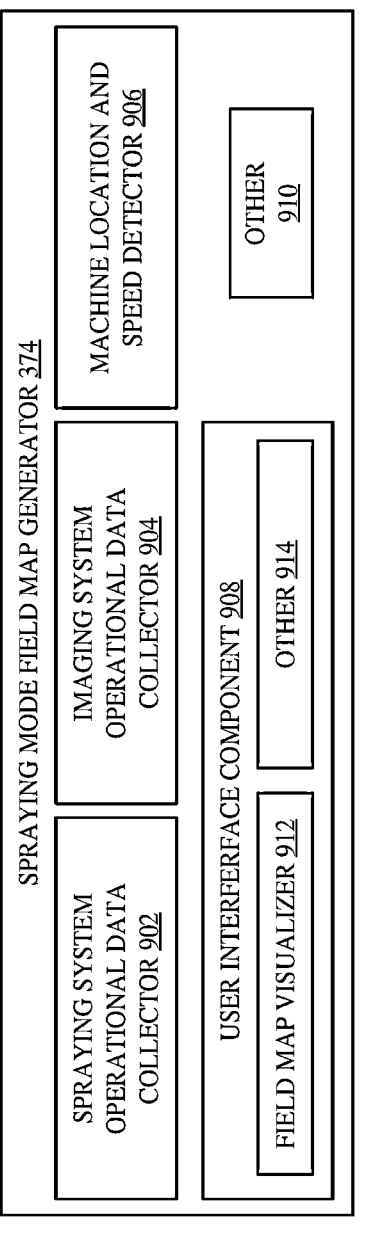
FIG. 18 is a block diagram illustrating one example of a spraying mode field map generator.

FIG. 18 is a block diagram illustrating one example of spraying mode field map generator 374, discussed above with respect to FIG. 4. Generator 374 includes a spraying system operational data collector 902, an imaging system operational data collector 904, a machine location and speed detector 906, a user interface component 908, and can include other items 910 as well.

Spraying system operational data collector 902 is configured to collect operational data that represents operation of spraying system 102 as spraying machine 100 traverses a field. The operational data indicates, for example, which spraying mode (e.g., broadcast or precision spraying) is activated at various locations in the field. Also, the spraying system operational data can indicate application rates of the substance at different locations in the field, etc. Imaging system operational data collector 904 is configured to obtain data representing operation of cameras 260 and/or image processing components 238. For example, the data collected or obtained by collector 904 indicates locations in the field where images were acquired by cameras 260 to perform plant classification, to identify target plant types in those areas. Machine location and speed detector 906 is configured to identify the location and speed of machine 100 as it traverses the field. For example, detector 906 can generate a machine path across the field. User interface component 908 includes a field map visualizer 912, and can include other items 914 as well. Field map visualizer 912 is configured to generate and render a field map to operator 228, or another user. Examples are discussed in further detail below.

Figure 19:
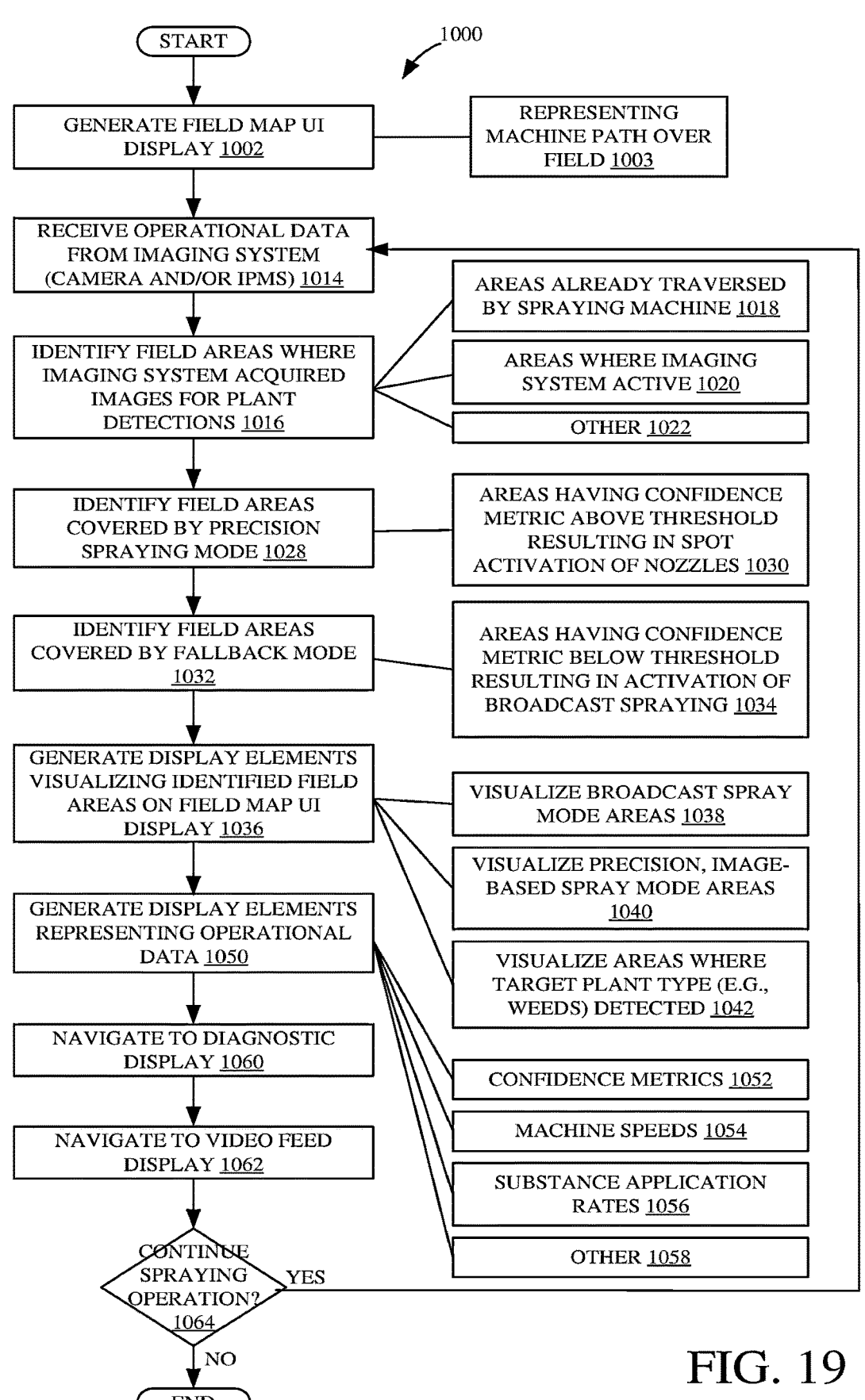
FIG. 19 provides a flow diagram illustrating an example operation of an agricultural machine to generate a field map representing spraying operations.

FIG. 19 provides a flow diagram 1000 illustrating an example operation of an agricultural machine to generate a field map representing spraying operations. For sake of illustration, but not by limitation, FIG. 19 will be described in the context of agricultural machine 100 and spraying mode field map generator 374, discussed above.

At block 1002, user interface component 908 generates a field map user interface display that represents the field on which agricultural spraying machine 100 is operating. For example, the user interface display can represent the machine path over the field, as represented by block 1003. One example of a field map user interface display 1004 is illustrated in FIG. 20.

Figure 20:
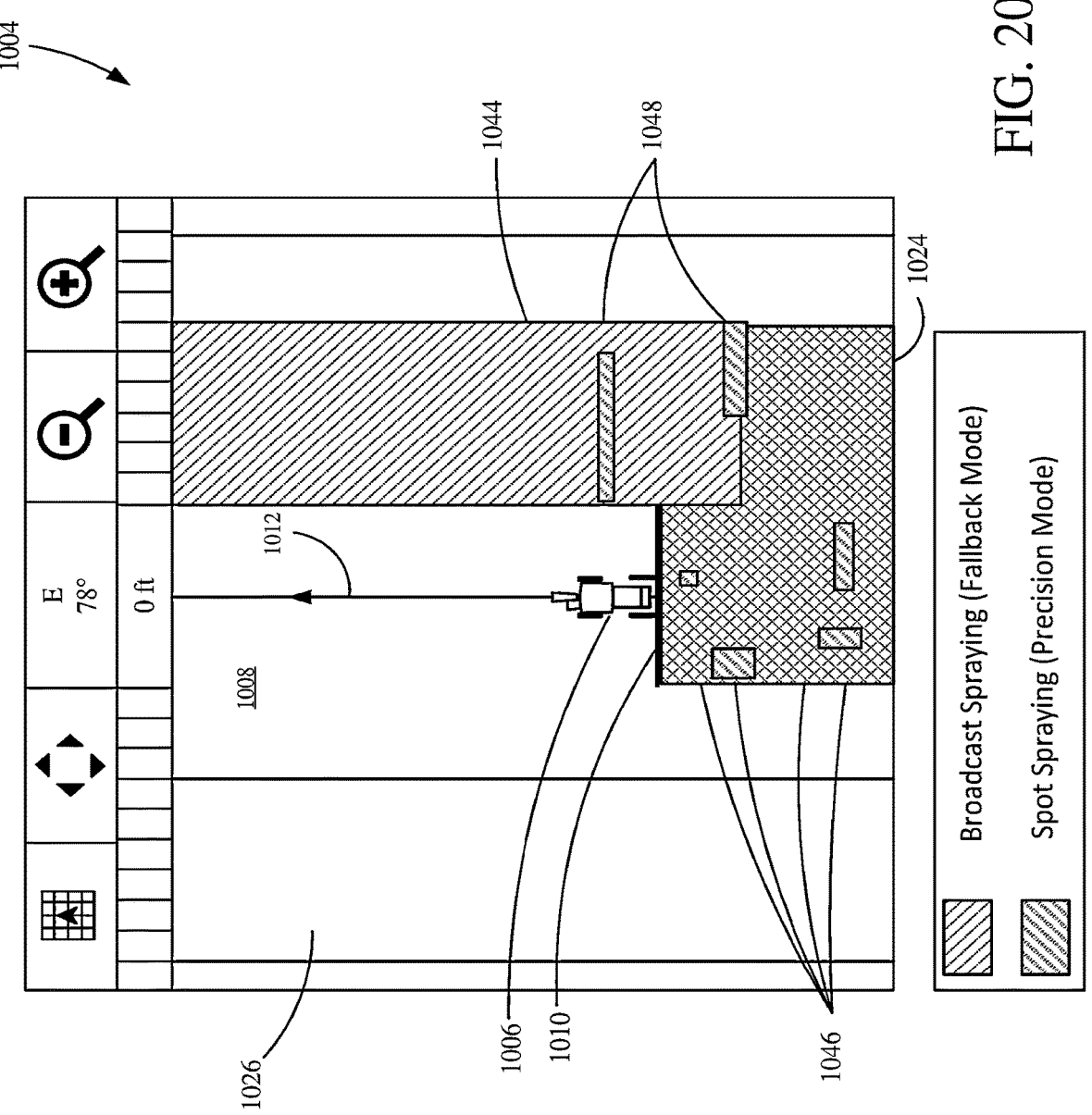
FIG. 20 illustrates one example of a user interface display.

As shown in FIG. 20, display 1004 includes an icon 1006, or other representation, that represents the current position of spraying machine 100 on a field 1008. Display 1004 also includes a display element 1010 representing boom 110 of spraying machine 100, and a machine path display element 1012 representing the path of machine 100 over field 1008.

Referring again to FIG. 19, at block 1014 operational data is received from the imaging system of agricultural spraying machine 100. The operational data can include data from cameras 260 and/or image processing component 238. At block 1016, areas of the field where the imaging system acquired images for plant detection are identified. For example, these field areas can be identified based on areas already traversed by spraying machine 100 (represented at block 1018) and/or based on identifying areas where the imaging system was active (represented by block 1020). Of course, the field areas can be identified in other ways as well, as represented by block 1022. In the example of FIG. 20, display 1004 identifies areas already covered by the imaging system by highlighting those areas 1024 with a different color than a remaining portion 1026 on the field map.

At block 1028, field areas that were covered by the precision spraying mode are identified. As noted above, in one example these areas include areas having a confidence metric (block 1030), above a threshold where control system 206 controls nozzles 108 in a precision spraying mode that applies the agricultural substance to discrete dispersal areas.

At block 1032, field areas covered by the default or fallback mode (e.g., the broadcast spraying mode) are identified. As noted above, default mode areas having a confidence metric that is below the threshold, upon which control system 206 controls nozzles 103 in a broadcast spraying mode. One example includes activating all nozzles to deliver the agricultural substance in a substantially uniform manner, as represented by block 1034.

At block 1036, display elements are provided on the field map user interface display to visualize the identified field areas. An example includes visualizing the broadcast mode areas at block 1038 and visualizing the image-based spray mode areas at block 1040. Also, areas where the target plant type are detected can also be visualized, as represented at block 1042.

Referring again to FIG. 20, display 1004 includes a first type of display element 1044 that represents the broadcast spray mode areas and a second type of display element 1046 that is visually distinguished from the first type and identifies the precision, image-based spray mode areas. In one example, display elements 1044 and 1046 are rendered in different colors, to visually distinguish broadcast spray mode areas from precision spray-mode areas. Also, in the example of FIG. 20, areas of the field where the target plant type were detected, but the broadcast spraying mode area was activated, can also be identified. For example, as shown at reference numerals 1048, image processor components 238 identified weeds (or other target plant type) at areas in the field, but the confidence metric was too low to deactivate the broadcast spraying mode. Using the diagnostic data, operator 226 can manually adjust the machine operation, such as by slowing the machine speed, reducing the boom height, or other corrective action. Accordingly, the field map displayed in user interface display 1004 allows operator 228 to easily identify how the spraying system 102 is operated at various locations on the field.

Referring again to FIG. 19, display elements representing operational data can be displayed at block 1050. For example, display elements representing the confidence metrics (block 1052) can be rendered on display 1004 at corresponding locations on the map. Also, display elements representing the machine speed (block 1054) and/or substance application rates (block 1056) can also be rendered on display 1004 at corresponding locations in the field. Of course, other display elements can be provided as well, as represented at block 1058.

At block 1060, a user interface mechanism can be provided to navigate to a diagnostic display, such as the displays shown in FIGS. 13-16. Also, a user interface mechanism can be provided at block 1062 that allows the user to navigate to a video feed display, such as that shown in FIG. 6. At block 1064, for continued spraying operation, the process returns to block 1014.

It can thus be seen that the present system provides a number of advantages. For example, but not by limitation, operation of an image-based spraying control system is detected and visualized with controls to calibrate or configure the imaging system, which can improve spraying performance. Further, improved spraying performance can include increase productive and crop yields, and to reduce occurrence of over-spray or under-spray.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 21:
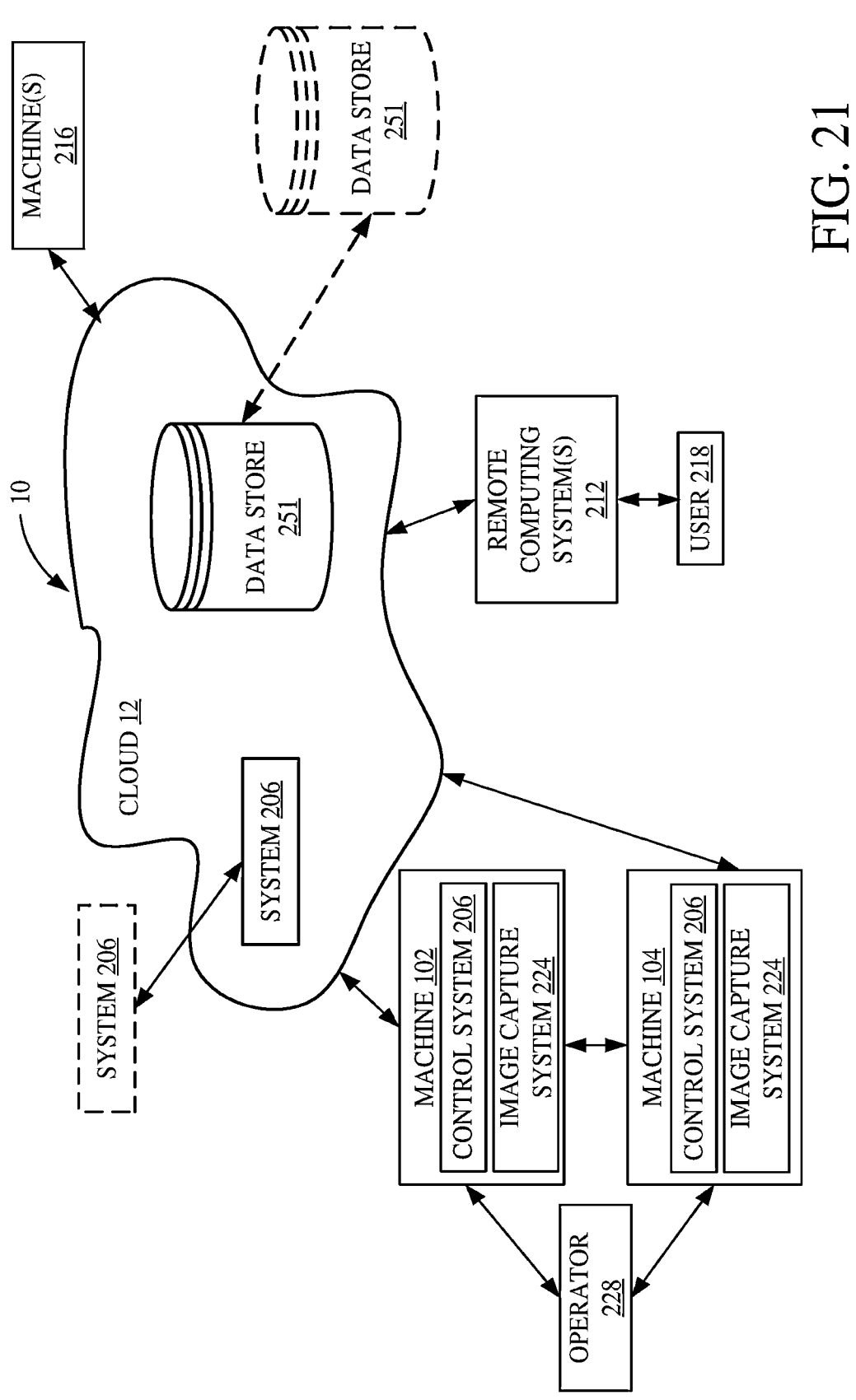
FIG. 21 is a block diagram showing one example of the architecture illustrated in FIG. 2, deployed in a remote server architecture.

FIG. 21 is a block diagram of one example of the architecture shown in FIG. 2, where agricultural spraying machine 100 communicates with elements in a remote server architecture 10. In an example, remote server architecture 10 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 21, some items are similar to those shown in FIG. 2 and they are similarly numbered. FIG. 21 specifically shows that system 206 and data store 251 can be located at a remote server location 12. Therefore, machine 100 accesses those systems through remote server location 12.

FIG. 21 also depicts another example of a remote server architecture. FIG. 21 shows that it is also contemplated that some elements of FIG. 2 are disposed at remote server location 12 while others are not. By way of example, data store 251 can be disposed at a location separate from location 12, and accessed through the remote server at location 12. Alternatively, or in addition, system 206 can be disposed at location(s) separate from location 12, and accessed through the remote server at location 12.

Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine until the agricultural machine enters a covered location. The machine, itself, can then send and receive the information to/from the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 22:
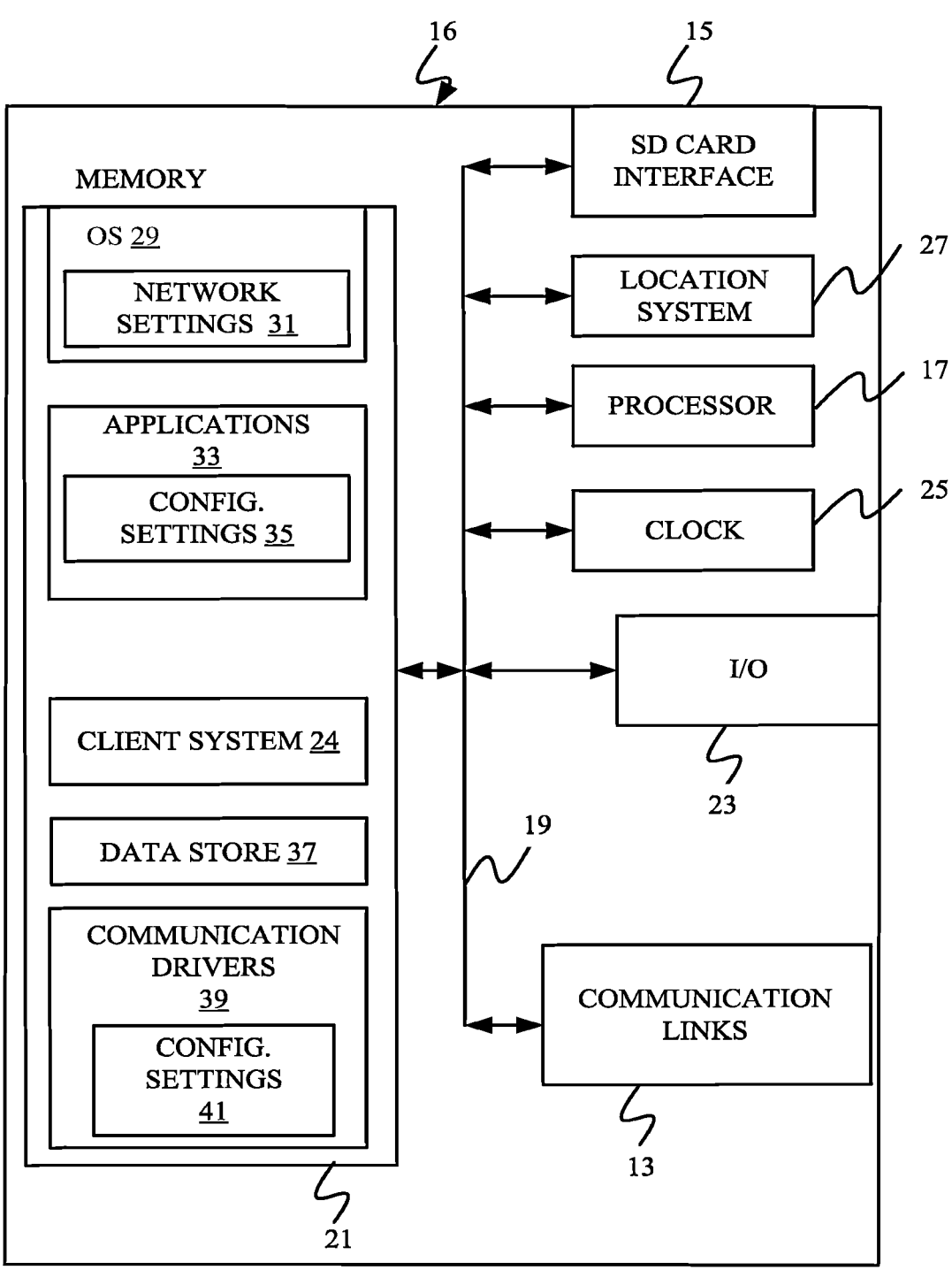
FIGS. 22-24 show examples of mobile devices that can be used in the architectures shown in the previous figures.
Figure 23:
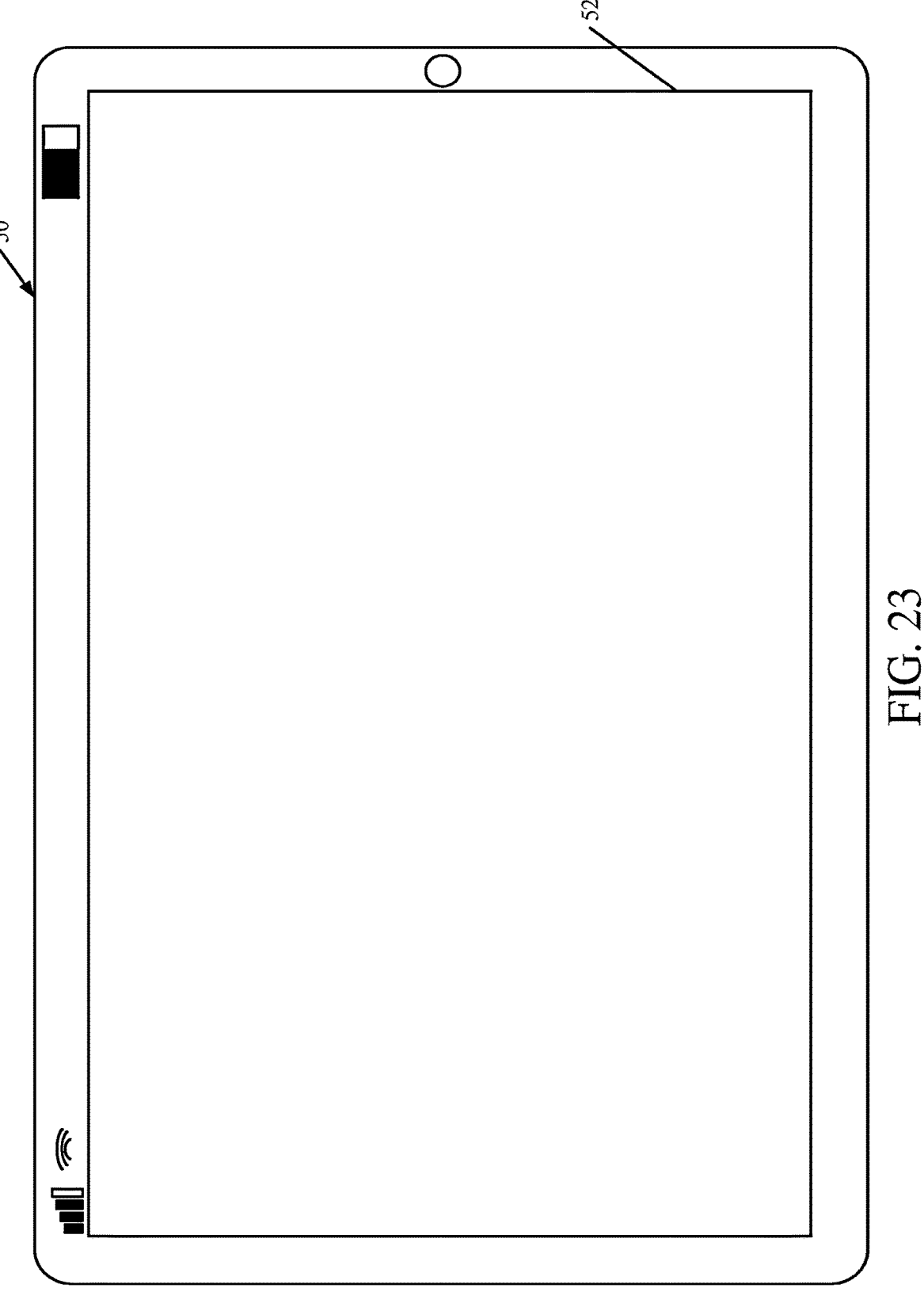
Figure 24:
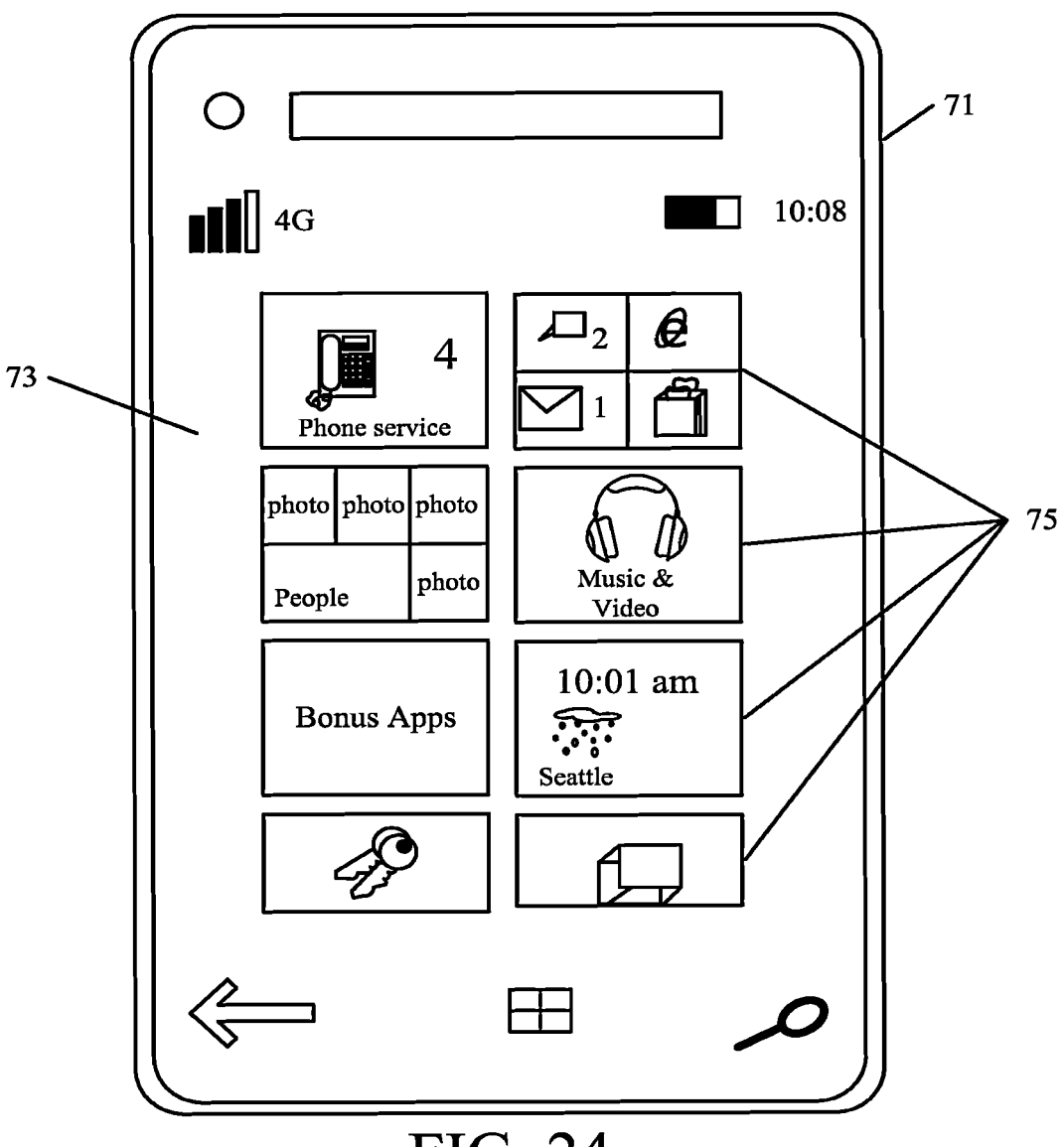

FIG. 22 is a simplified block diagram of one illustrative example of a handheld or mobile computing device that can be used as a user's or client's handheld device 16, in which the present system (or parts of it) can be deployed. For instance, a mobile device can be deployed in the operator compartment of agricultural machine 100 (or 202) or as remote computing system 212. FIGS. 23-24 are examples of handheld or mobile devices.

FIG. 22 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. Location system 27 can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 23 shows one example in which device 16 is a tablet computer 50. In FIG. 23, computer 50 is shown with user interface display screen 52. Screen 52 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 50 can also illustratively receive voice inputs as well.

FIG. 24 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 25:
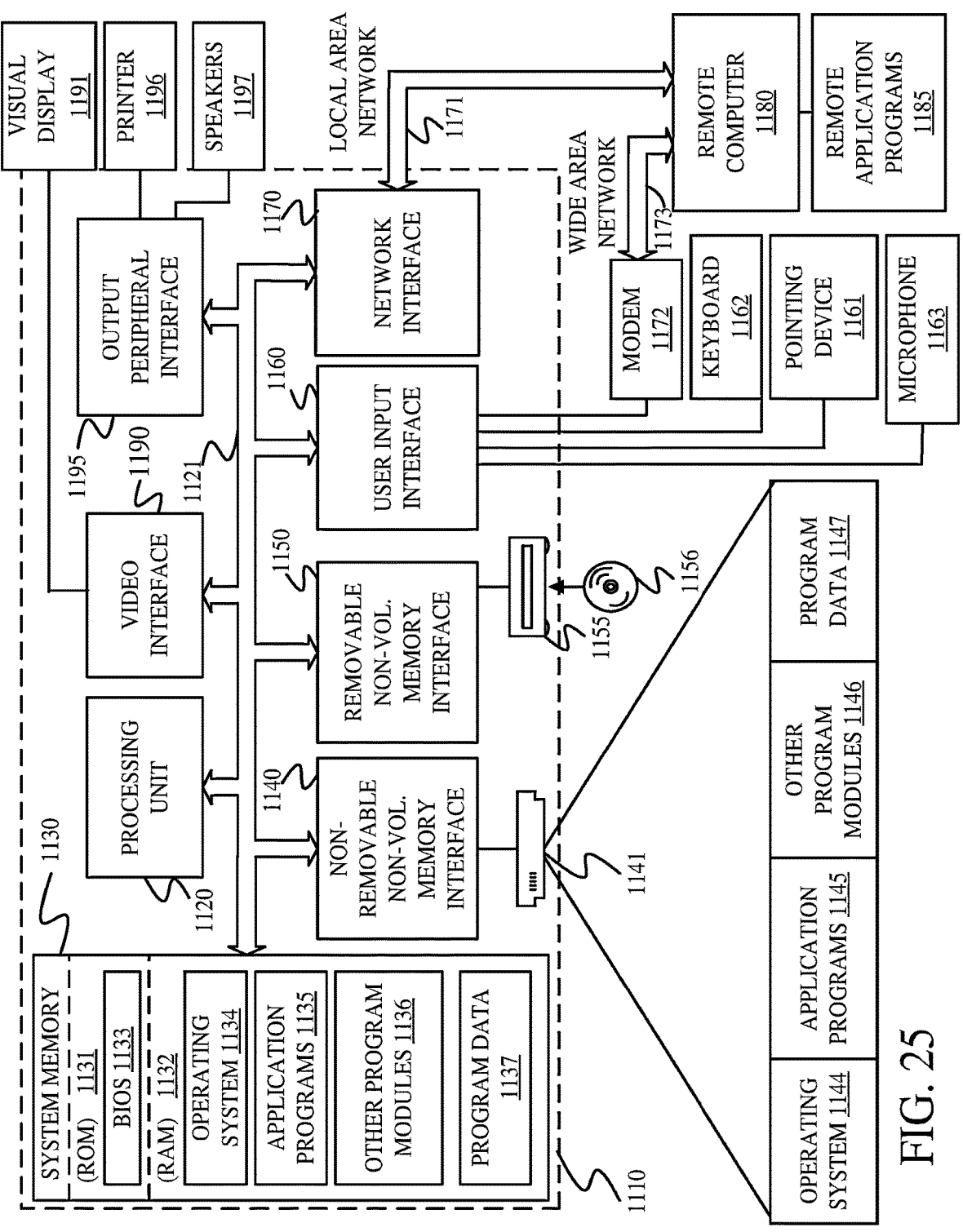
FIG. 25 is a block diagram showing one example of a computing environment that can be used in the architectures shown in the previous figures.

FIG. 25 is one example of a computing environment in which elements of FIG. 2, or parts of it, (for example) can be deployed. With reference to FIG. 25, an example system for implementing some embodiments includes a computing device in the form of a computer 1110. Components of computer 1110 may include, but are not limited to, a processing unit 1120 (which can comprise processors or servers from previous FIGS.), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. Memory and programs described with respect to FIG. 2 can be deployed in corresponding portions of FIG. 25.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 25 illustrates operating system 1134, application programs 1135, other program modules 1136, and program data 1137.

The computer 1110 may also include other removable/non-removable volatile/nonvolatile computer storage media. By way of example only, FIG. 25 illustrates a hard disk drive 1141 that reads from or writes to non-removable, nonvolatile magnetic media, an optical disk drive 1155, and nonvolatile optical disk 1156. The hard disk drive 1141 is typically connected to the system bus 1121 through a non-removable memory interface such as interface 1140, and optical disk drive 1155 is typically connected to the system bus 1121 by a removable memory interface, such as interface 1150.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 25, provide storage of computer readable instructions, data structures, program modules and other data for the computer 1110. In FIG. 25, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137.

A user may enter commands and information into the computer 1110 through input devices such as a keyboard 1162, a microphone 1163, and a pointing device 1161, such as a mouse, trackball or touch pad. Other input devices (not shown) may include a joystick, game pad, satellite dish, scanner, or the like. These and other input devices are often connected to the processing unit 1120 through a user input interface 1160 that is coupled to the system bus, but may be connected by other interface and bus structures. A visual display 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 is operated in a networked environment using logical connections (such as a local area network-LAN, or wide area network-WAN or a controller area network-CAN) to one or more remote computers, such as a remote computer 1180.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. In a networked environment, program modules may be stored in a remote memory storage device. FIG. 25 illustrates, for example, that remote application programs 1185 can reside on remote computer 1180.

It should also be noted that the different examples described herein can be combined in different ways. That is, parts of one or more examples can be combined with parts of one or more other examples. All of this is contemplated herein.

Example 1 is an agricultural machine comprising:
a product application system comprising a plurality of actuatable applicator mechanisms, each actuatable applicator mechanism configured to apply a substance on a field;
an imaging system configured to obtain image data indicative of plant matter on the field; and
a control system configured to:
control one or more of the actuatable applicator mechanisms to apply the substance to a dispersal area on the field based on the image data; and
generate a user interface display that displays a field map including a display element that represents the dispersal area on the field.

Example 2 is the agricultural machine of any or all previous examples, wherein the plurality of actuatable applicator mechanisms are spaced apart along a frame.

Example 3 is the agricultural machine of any or all previous examples, wherein the agricultural machine comprises an agricultural sprayer and the plurality of actuatable applicator mechanisms comprise a plurality of controllable spray nozzles.

Example 4 is the agricultural machine of any or all previous examples, wherein the control system is configured to selectively operate the actuatable applicator mechanisms in one of a first mode or a second mode based on the image data.

Example 5 is the agricultural machine of any or all previous examples, wherein the first mode comprises a broadcast spraying mode that applies the substance across a length of the boom and the second mode comprises a precision spraying mode that controls some, but not all, of the plurality of actuatable applicator mechanisms to apply the substance to one or more discrete dispersal areas on the field.

Example 6 is the agricultural machine of any or all previous examples, wherein the field map includes:
a first mode display element that represents a first portion of the field to which the substance was applied in the first mode, and
a second mode display element that represents a second portion of the field to which the substance was applied in the second mode.

Example 7 is the agricultural machine of any or all previous examples, wherein the first mode display element is displayed with a visual characteristic that visually distinguishes the first portion from the second portion.

Example 8 is the agricultural machine of any or all previous examples, wherein the control system is configured to determine a characteristic of the plant matter based on the image data and to select one of the first mode or the second mode based on the determined characteristic.

Example 9 is the agricultural machine of any or all previous examples, wherein the control system is configured to:
classify the plant matter as being a target plant type;

generate a confidence metric representing the classification; and select one of the first mode or the second mode based on comparing the confidence metric to a confidence threshold.

Example 10 is the agricultural machine of any or all previous examples, wherein the control system is configured to:

operate the product application system in the first mode based on a determination that the confidence metric is below a confidence threshold; and operate the product application system in the second mode based on a determination that the confidence metric is above the confidence threshold.

Example 11 is a method performed by an agricultural machine, the method comprising:

obtaining image data indicative of plant matter on a field;

controlling one or more of a plurality of actuatable applicator mechanisms on the agricultural machine to apply a substance to a dispersal area on the field based on the image data; and generating a user interface display that displays a field map that represents the field, the field map including a display element that represents the dispersal area on the field.

Example 12 is the method of any or all previous examples, wherein the agricultural machine comprises an agricultural sprayer and the plurality of actuatable applicator mechanisms comprise a plurality of controllable spray nozzles.

Example 13 is the method of any or all previous examples, and further comprising:

selectively controlling the actuatable applicator mechanisms in a first mode or a second mode based on the image data.

Example 14 is the method of any or all previous examples, wherein the first mode comprises a broadcast spraying mode and the second mode comprises a precision spraying mode that controls some, but not all, of the plurality of actuatable applicator mechanisms to apply the substance to one or more discrete dispersal areas on the field.

Example 15 is the method of any or all previous examples, wherein the field map includes:

a first mode display element that represents a first portion of the field to which the substance was applied in the first mode, and a second mode display element that represents a second portion of the field to which the substance was applied in the second mode.

Example 16 is the method of any or all previous examples, wherein the first mode display element is displayed with a visual characteristic that visually distinguishes the first portion from the second portion.

Example 17 is the method of any or all previous examples, and further comprising:

determining a characteristic of the plant matter based on the image data;

classifying the plant matter based on the determined characteristic;

generate a confidence metric representing the classification; and selecting one of the first mode or the second mode based on comparing the confidence metric to a confidence threshold.

Example 18 is the method of any or all previous examples, and further comprising:

operate the actuatable applicator mechanisms in the first mode based on a determination that the confidence metric is below a confidence threshold; and operate the actuatable applicator mechanisms in the second mode based on a determination that the confidence metric is above the confidence threshold.

Example 19 is a control system for an agricultural machine, the control system comprising:

at least one processor; and memory storing instructions executable by the at least one processor, wherein the instructions, when executed, cause the control system to:

obtain image data indicative of plant matter on a field;

control one or more of a plurality of actuatable applicator mechanisms on the agricultural machine to apply a substance to a dispersal area on the field based on the image data; and generate a user interface display that displays a field map that represents the field, the field map including a display element that represents the dispersal area on the field.

Example 20 is the control system of any or all previous examples, wherein the agricultural machine comprises a boom and the plurality of actuatable applicator mechanisms are spaced apart along the boom, and the control system is configured to selectively operate the actuatable applicator mechanisms in one of a first mode or a second mode based on the image data, and wherein the field map includes:

a first mode display element that represents a first portion of the field to which the substance was applied in the first mode, and a second mode display element that represents a second portion of the field to which the substance was applied in the second mode.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

obtaining image data indicative of plant matter on a field;

identifying, based on the image data, a plurality of discrete areas on the field in a path of an agricultural machine to apply an agricultural product, the agricultural machine comprising a product application system having a plurality of actuatable applicator mechanisms;

generating, for each respective discrete area of the plurality of discrete areas, location data identifying a respective geographic location of the respective discrete area based on the image data;

operating the product application system to apply the agricultural product to the plurality of discrete areas on the field based on the location data; and generating a user interface display that displays a field representation with spray area display elements at display locations on the user interface display identified based on the location data.

2. The method of claim 1, wherein operating the product application system comprises:

selecting a mode from a plurality of product application modes based on the image data; and operating the product application system in the mode.

3. The method of claim 2, wherein selecting the mode comprises:

determining a characteristic of plant matter on the field based on the image data; and selecting the mode from the plurality of product application modes based on the characteristic.

4. The method of claim 3, wherein selecting the mode comprises:

generating a classification result representing a classification of the plant matter as a target plant type based on the image data;

generating a confidence metric representing the classification result;

selecting the mode from the plurality of product application modes based on comparing the confidence metric to a confidence threshold.

5. The method of claim 4, wherein the method comprises:

operating the product application system in a first mode based on a determination that the confidence metric is below a confidence threshold; and operating the product application system in a second mode based on a determination that the confidence metric is above the confidence threshold.

6. The method of claim 1, wherein the plurality of actuatable applicator mechanisms are spaced apart along a frame of the agricultural machine.

7. The method of claim 6, wherein the agricultural machine comprises an agricultural sprayer and the plurality of actuatable applicator mechanisms comprise a plurality of spray nozzles.

8. The method of claim 7, wherein the plurality of spray nozzles are spaced apart along the frame to define a spray width, a first mode, of a plurality of product application modes, controls the plurality of spray nozzles to spray the agricultural product over the spray width, and a second mode, of the plurality of product application modes, controls a set of spray nozzles based on the image data, the set of spray nozzles comprising some, but not all, of the plurality of spray nozzles.

9. The method of claim 8, wherein the first mode comprises a broadcast spraying mode, the second mode comprises a precision spraying mode, and the user interface display comprises one or more broadcast mode display elements having a visual characteristic that identifies one or more areas on the field on which the broadcast spraying mode was performed.

10. The method of claim 1, wherein the field representation comprises a field map and the agricultural product comprises at least one of a herbicide, a fertilizer, or a fungicide.

11. An agricultural machine comprising:

a product application system comprising a plurality of actuatable applicator mechanisms, each actuatable applicator mechanism, of the plurality of actuatable applicator mechanisms, configured to apply an agricultural product on a field;

an imaging system configured to obtain image data indicative of plant matter on the field; and a control system configured to:

identify, based on the image data, a plurality of discrete areas on the field in a path of the agricultural machine to apply the agricultural product;

generate, for each respective discrete area of the plurality of discrete areas, location data identifying a respective geographic location of the respective discrete area based on the image data;

operate the product application system to apply the agricultural product to the plurality of discrete areas on the field based on the location data; and generate a user interface display that displays a field representation with spray area display elements at display locations on the user interface display identified based on the location data.

12. The agricultural machine of claim 11, wherein the control system is configured to:

determine a characteristic of plant matter on the field based on the image data;

select a mode from a plurality of product application modes based on the characteristic; and operate the product application system in the mode.

13. The agricultural machine of claim 12, wherein the control system is configured to:

generate a classification result representing a classification of the plant matter as a target plant type based on the image data;

generate a confidence metric representing the classification result;

operate the product application system in a first mode based on a determination that the confidence metric is below a confidence threshold; and operate the product application system in a second mode based on a determination that the confidence metric is above the confidence threshold.

14. The agricultural machine of claim 11, wherein the plurality of actuatable applicator mechanisms are spaced apart along a frame of the agricultural machine.

15. The agricultural machine of claim 14, wherein the agricultural machine comprises an agricultural sprayer and the plurality of actuatable applicator mechanisms comprise a plurality of spray nozzles.

16. The agricultural machine of claim 15, wherein the plurality of spray nozzles are spaced apart along the frame to define a spray width, a first mode, of a plurality of product application modes, controls the plurality of spray nozzles to spray the agricultural product over the spray width, and a second mode, of the plurality of product application modes, controls a set of spray nozzles based on the image data, the set of spray nozzles comprising some, but not all, of the plurality of spray nozzles.

17. The agricultural machine of claim 16, wherein the first mode comprises a broadcast spraying mode, the second mode comprises a precision spraying mode, and the user interface display comprises one or more broadcast mode display elements having a visual characteristic that identifies one or more areas on the field on which the broadcast spraying mode was performed.

18. The agricultural machine of claim 11, wherein the field representation comprises a field map and the agricultural product comprises at least one of a herbicide, a fertilizer, or a fungicide.

19. An agricultural machine control system comprising:

at least one processor; and memory storing instructions executable by the at least one processor, wherein the instructions, when executed, cause the agricultural machine control system to:

obtain image data indicative of plant matter on a field;

identify, based on the image data, a plurality of discrete areas on the field in a path of an agricultural machine to apply an agricultural product, the agricultural machine comprising a product application system having a plurality of actuatable applicator mechanisms;

generating, for each respective discrete area of the plurality of discrete areas based on the image data, location data identifying a respective geographic location of the respective discrete area;

operate the product application system to apply the agricultural product to the plurality of discrete areas on the field based on the location data;

generate a field representation that visually represents at least a portion of the field;

identify a plurality of display locations based on the location data, each display location, of the plurality of display locations, identifying a location on the field representation corresponding to a respective discrete area of the plurality of discrete areas; and generate a user interface display that displays the field representation with spray area display elements at the plurality of display locations.

20. The agricultural machine control system of claim 19, wherein the field representation comprises a field map and the agricultural product comprises at least one of a herbicide, a fertilizer, or a fungicide.

* * * * *